Figure 1:
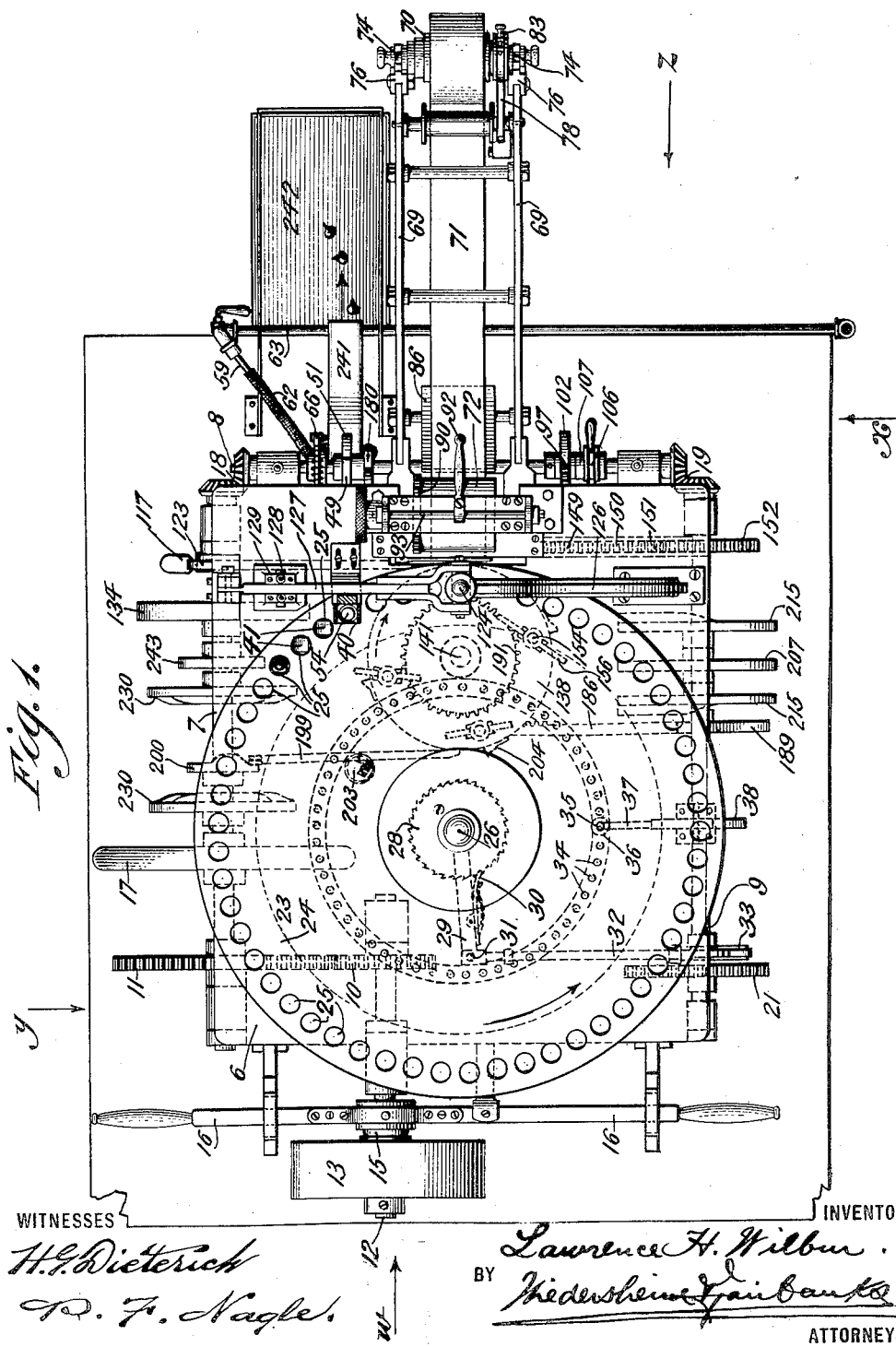

L. H. WILBUR.
WRAPPING MACHINE.
APPLICATION FILED OCT. 24, 1914.

1,131,881.

Patented Mar. 16, 1915.
15 SHEETS—SHEET 1.

WITNESSES
H. G. Dieterich
R. F. Nagle.

INVENTOR
Lawrence H. Wilbur.
BY Wiedersheim & Fairbanks
ATTORNEYS

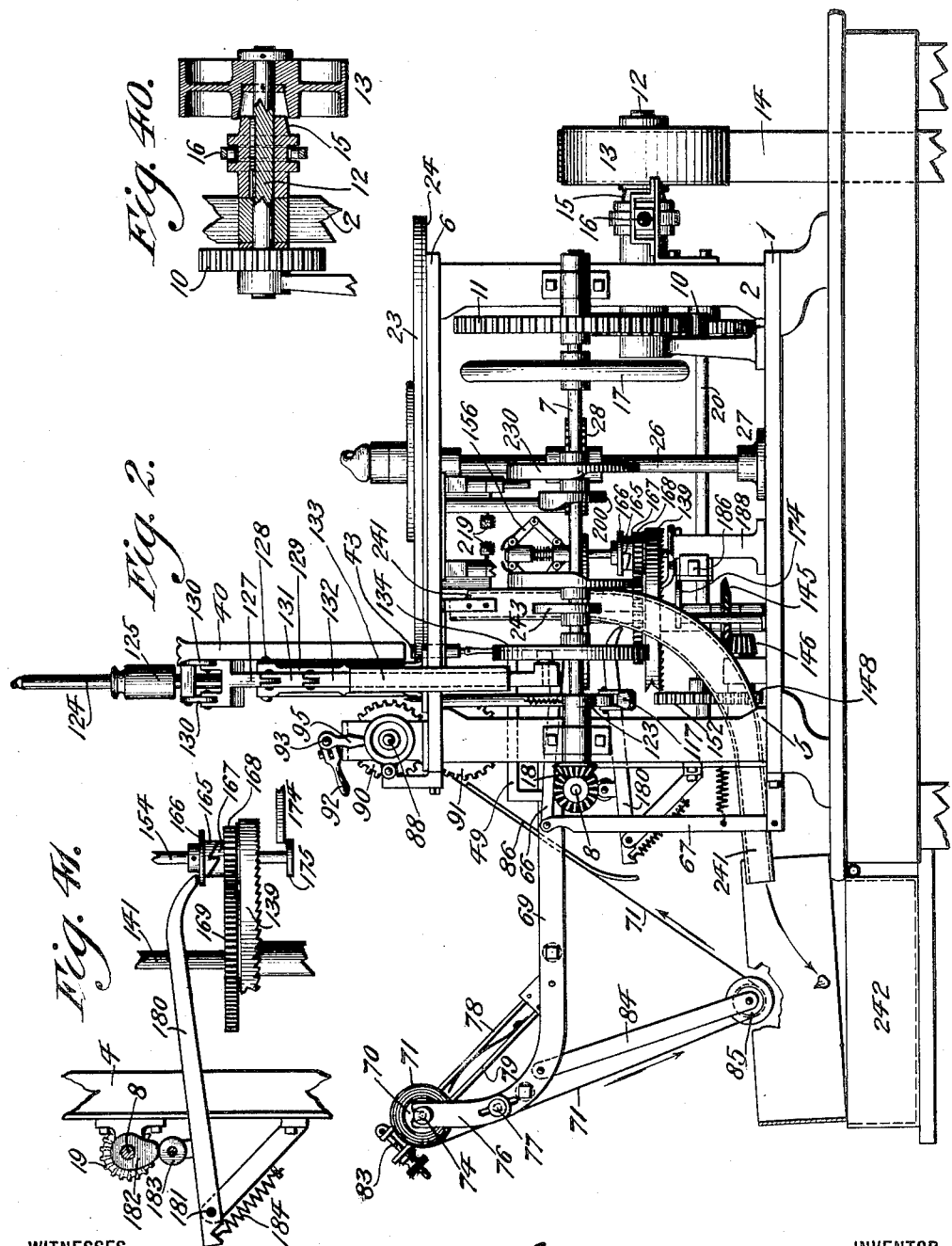

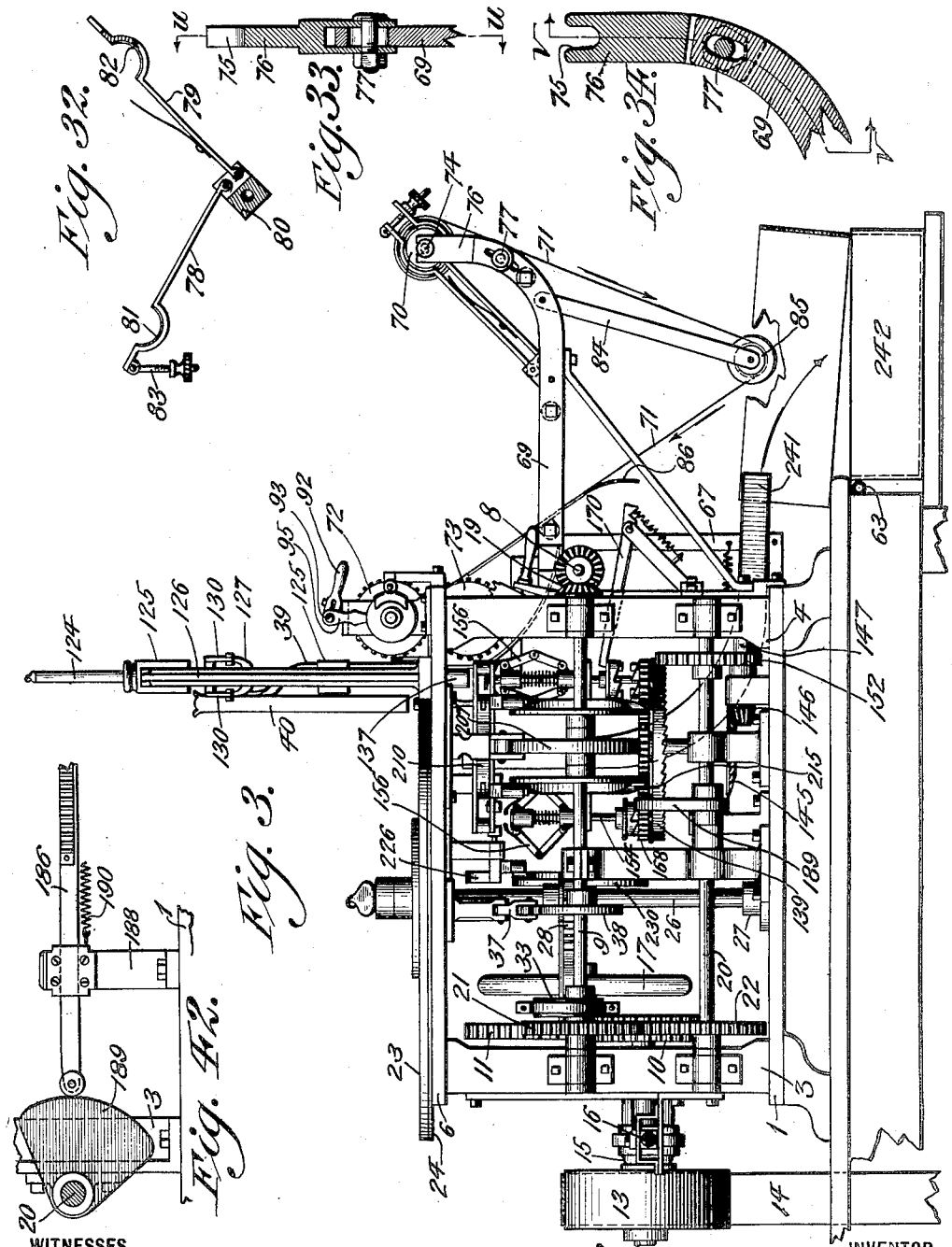

L. H. WILBUR.
WRAPPING MACHINE.
APPLICATION FILED OCT. 24, 1914.
1,131,881.
Patented Mar. 16, 1915.
15 SHEETS—SHEET 4.
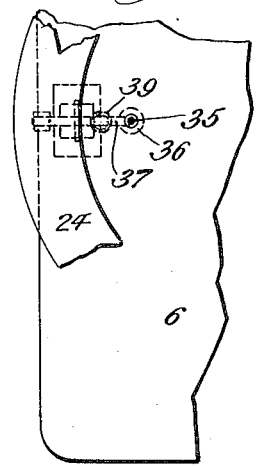
Fig. 35.
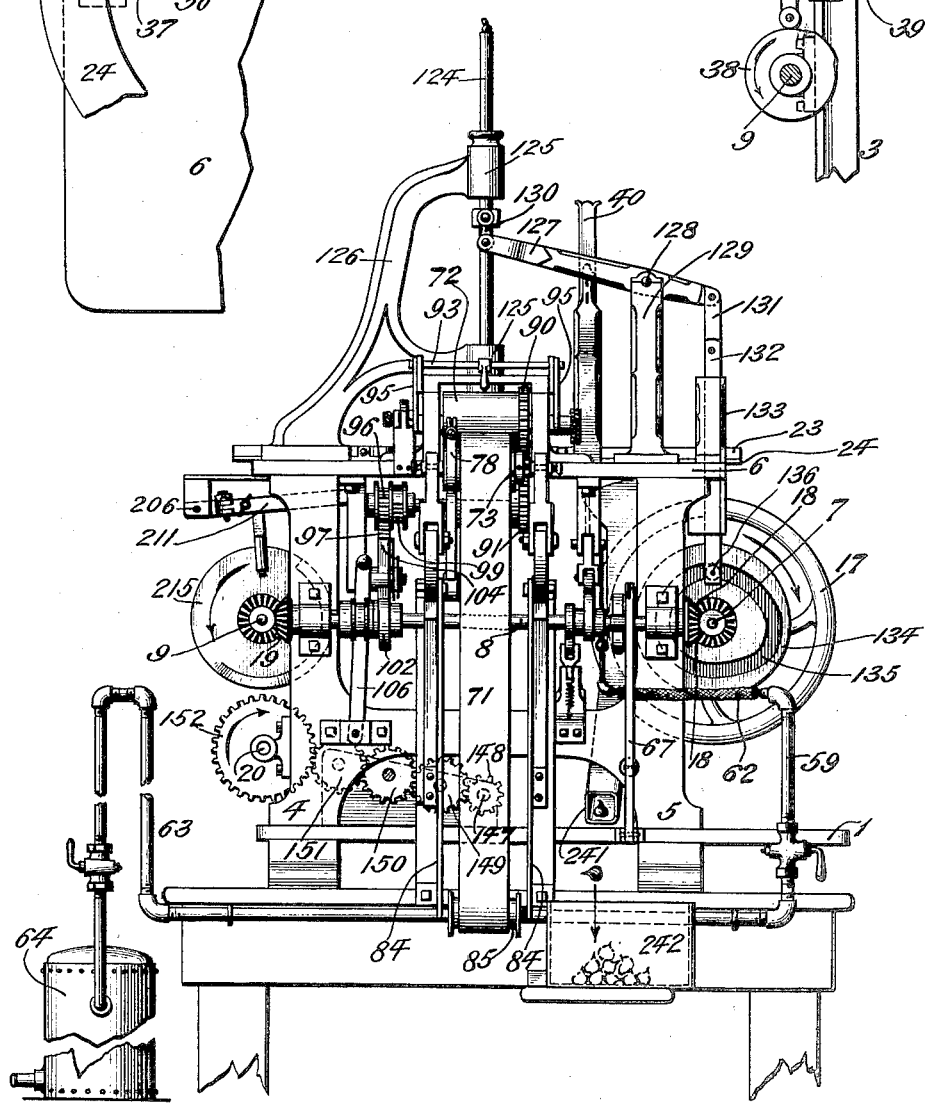
Fig. 4.
Fig. 36.
WITNESSES
L. Bouville
P. F. Nagle
INVENTOR
Lawrence H. Wilbur
BY Niedersheim & Fairbanks
ATTORNEYS L. H. WILBUR.
WRAPPING MACHINE.
APPLICATION FILED OCT. 24, 1914.
1,131,881.
Patented Mar. 16, 1915.
15 SHEETS—SHEET 5.
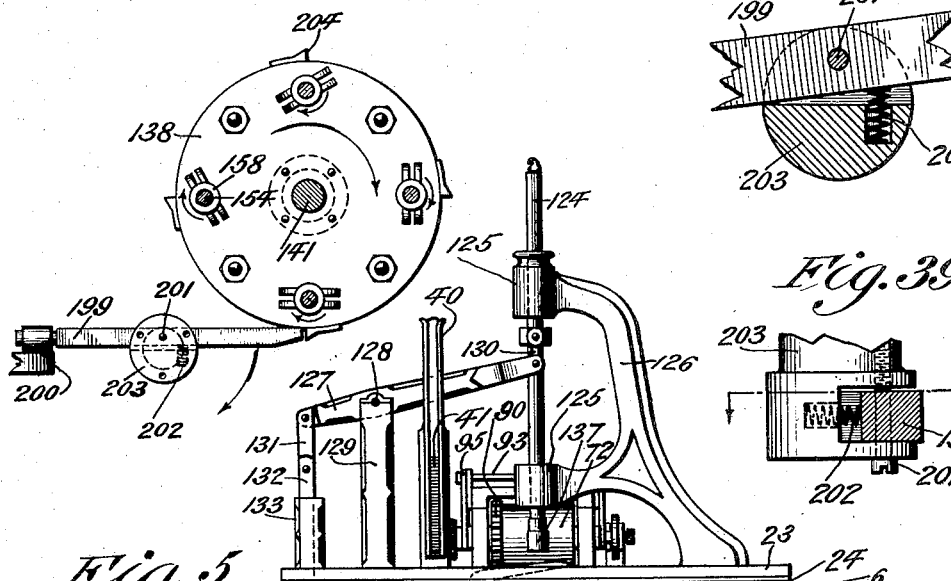
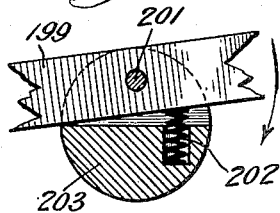
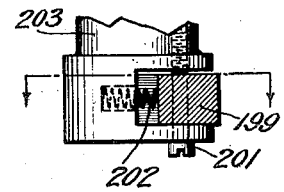
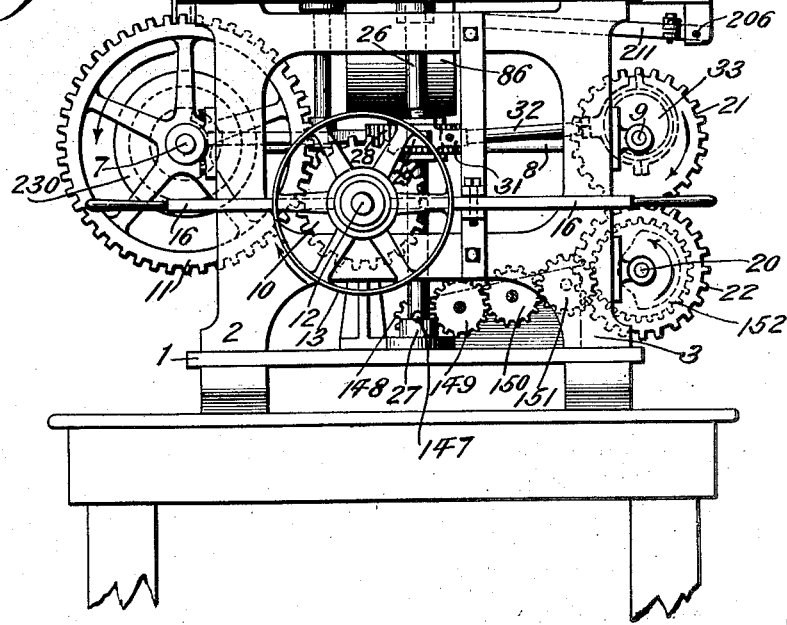

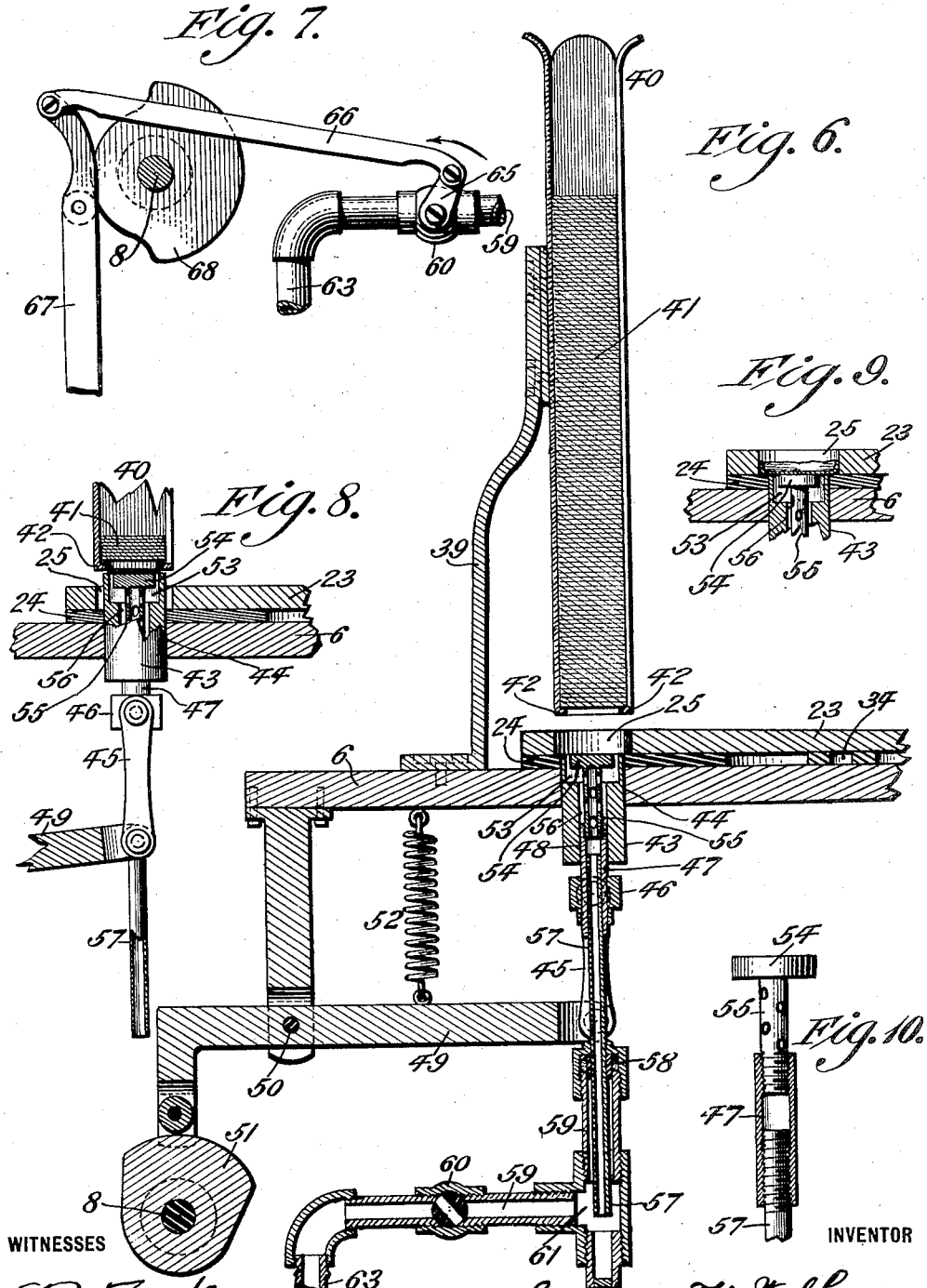

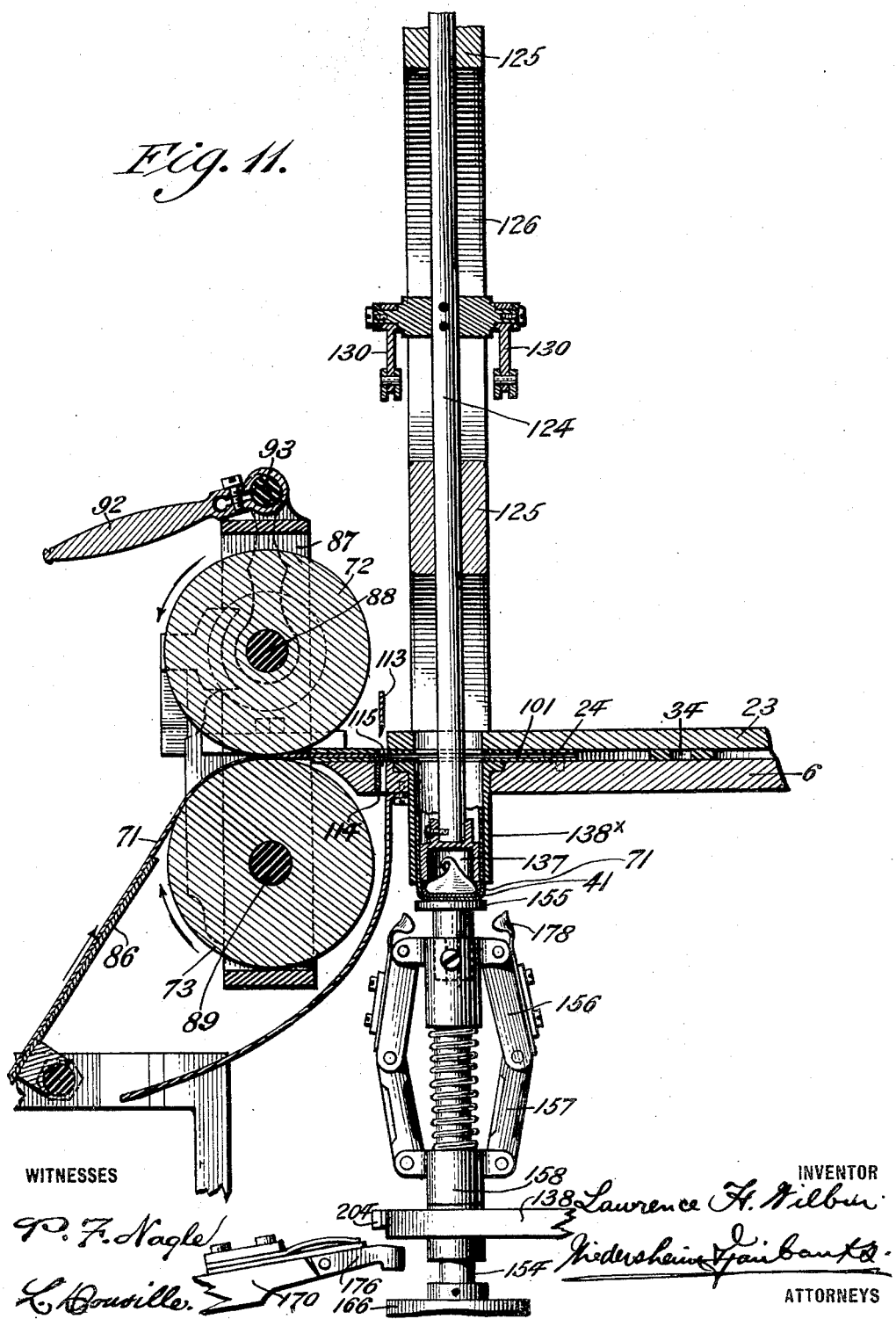

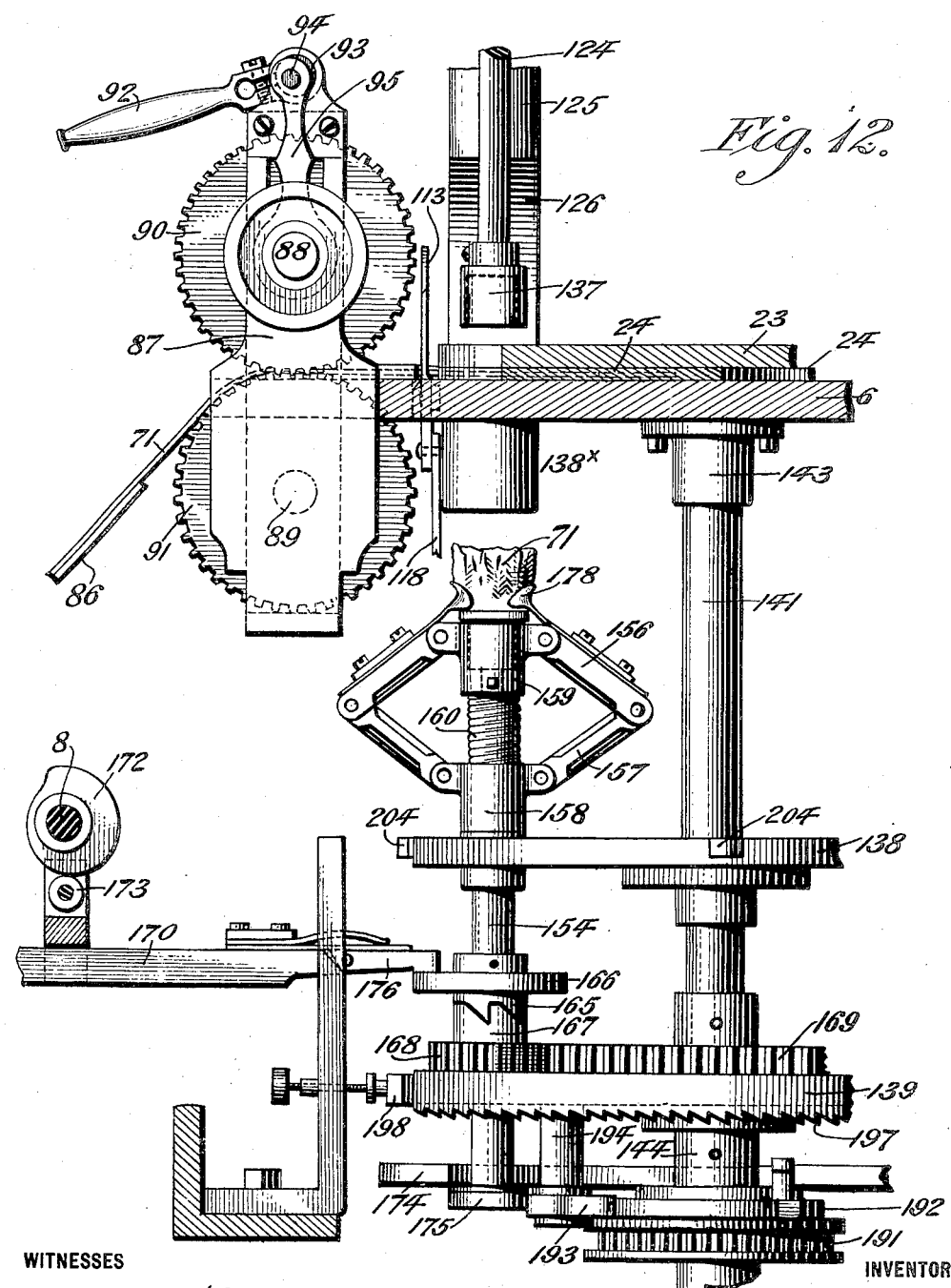

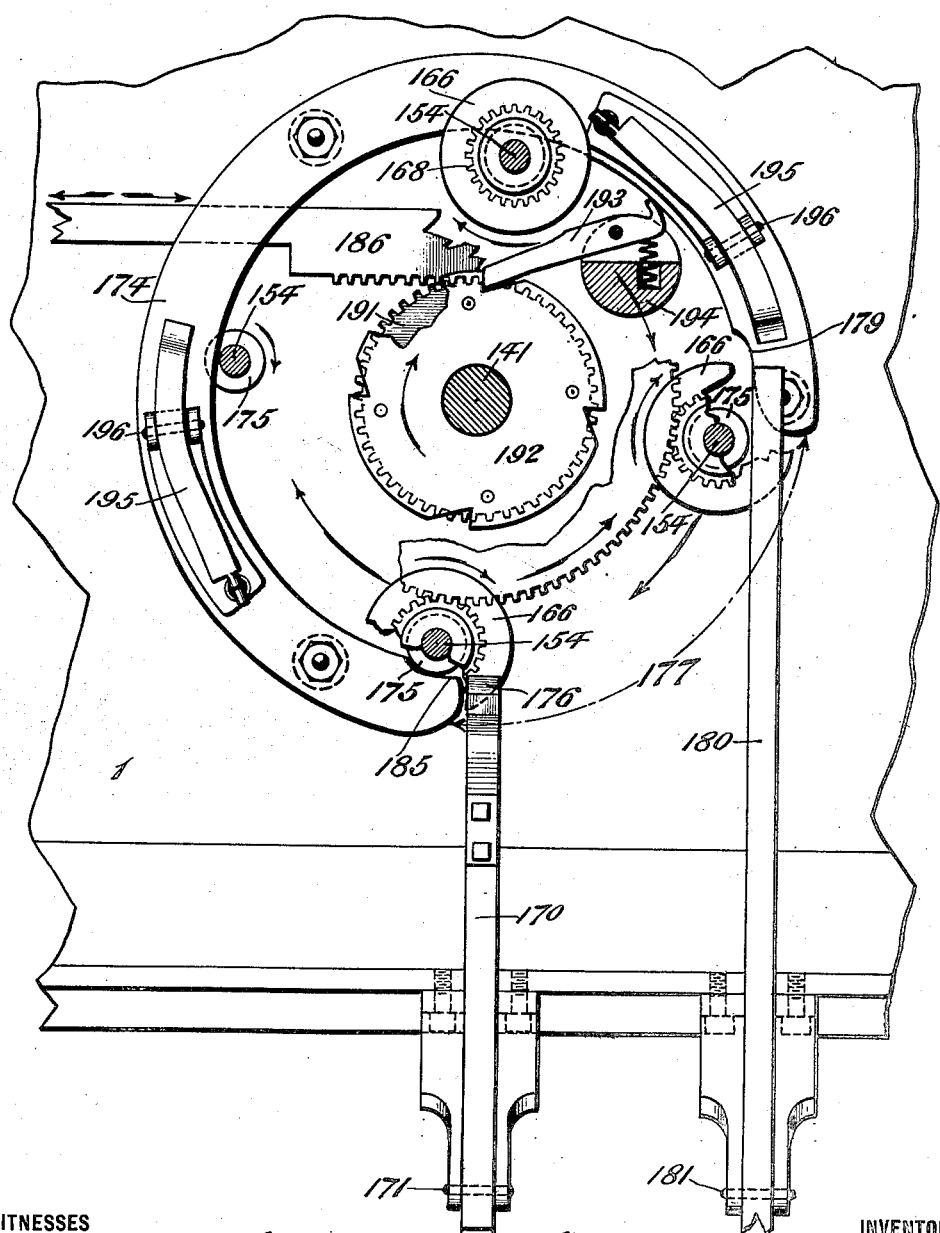

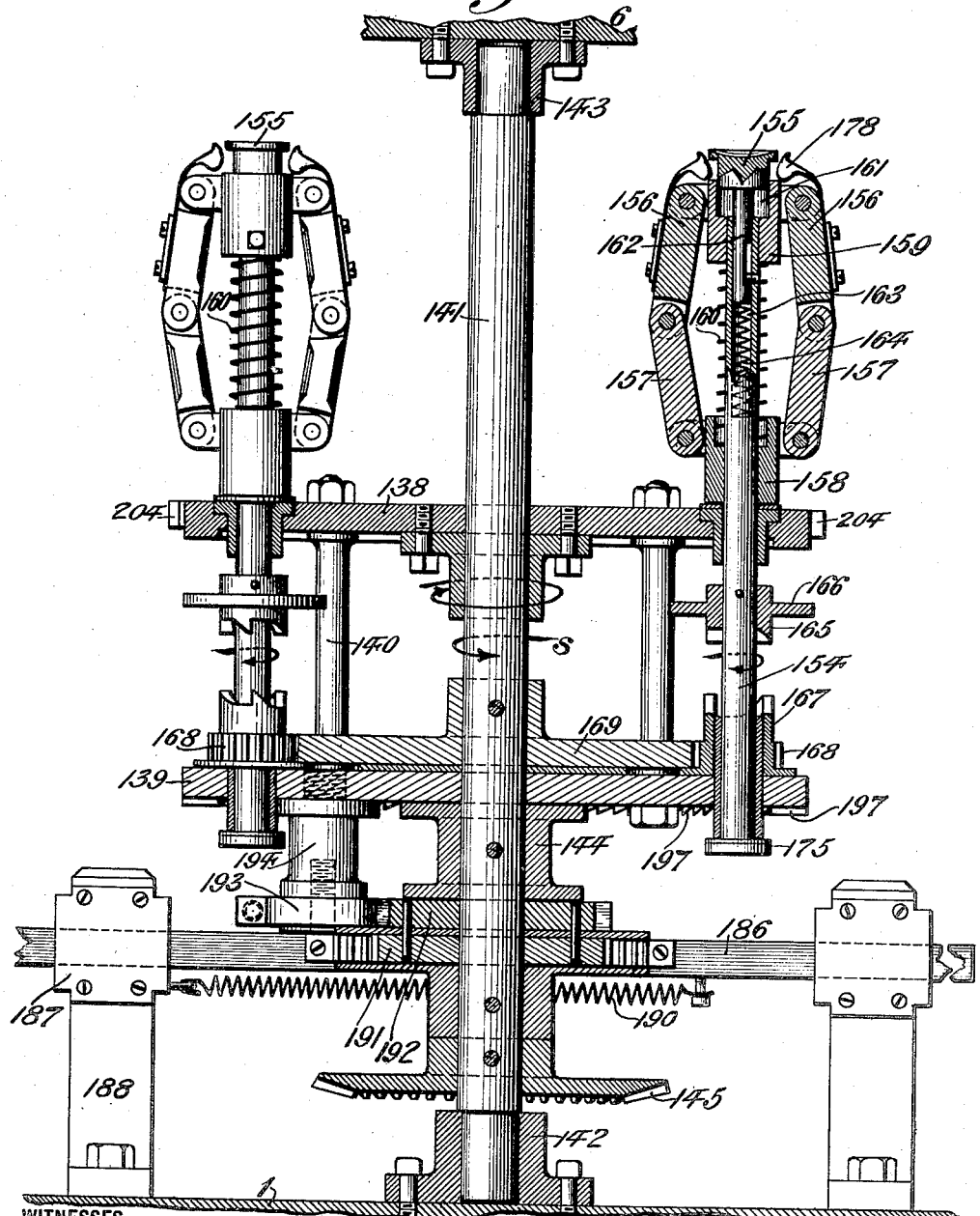

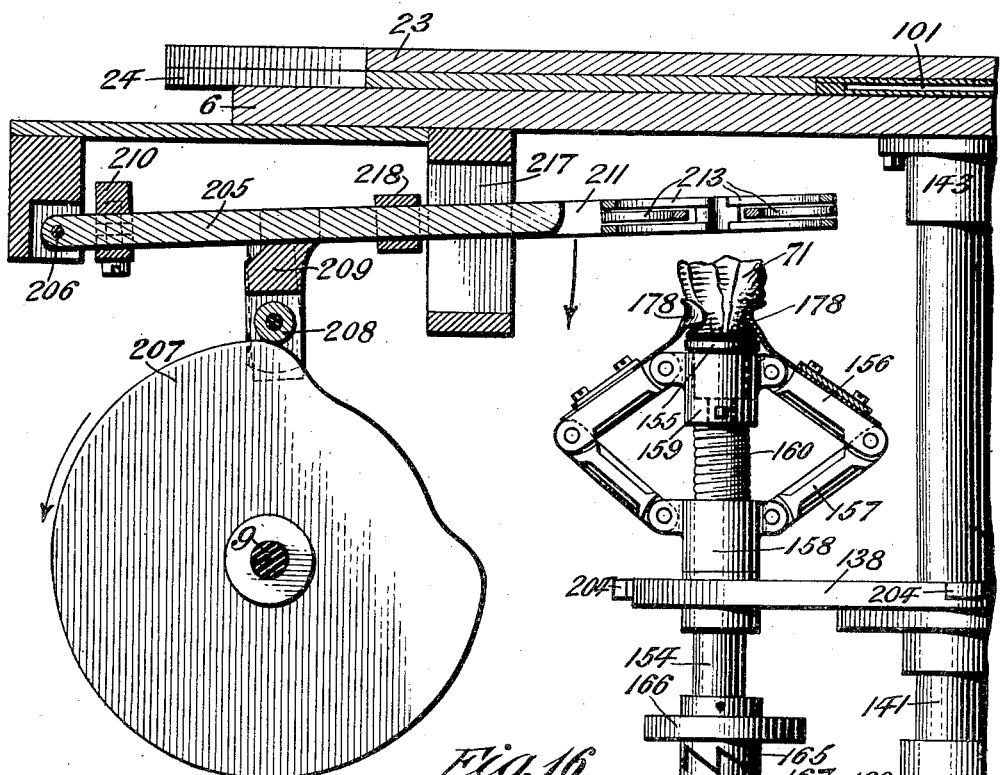
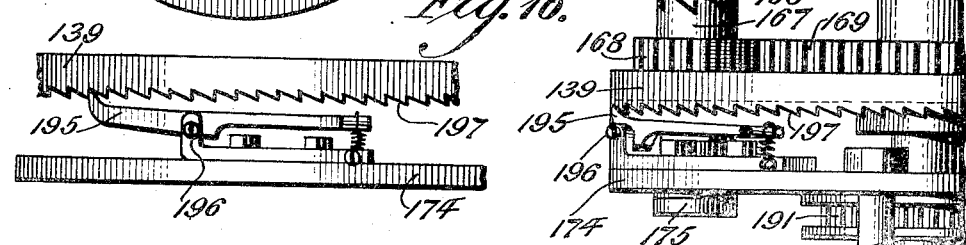

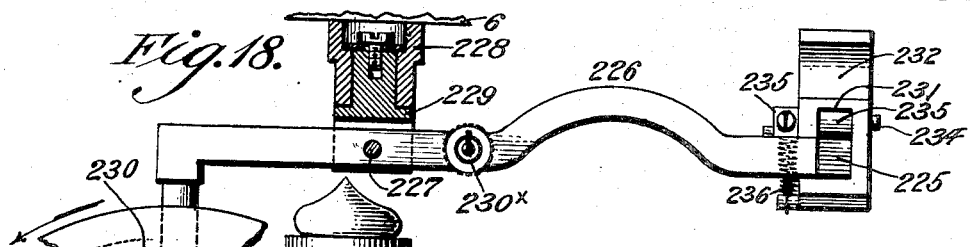
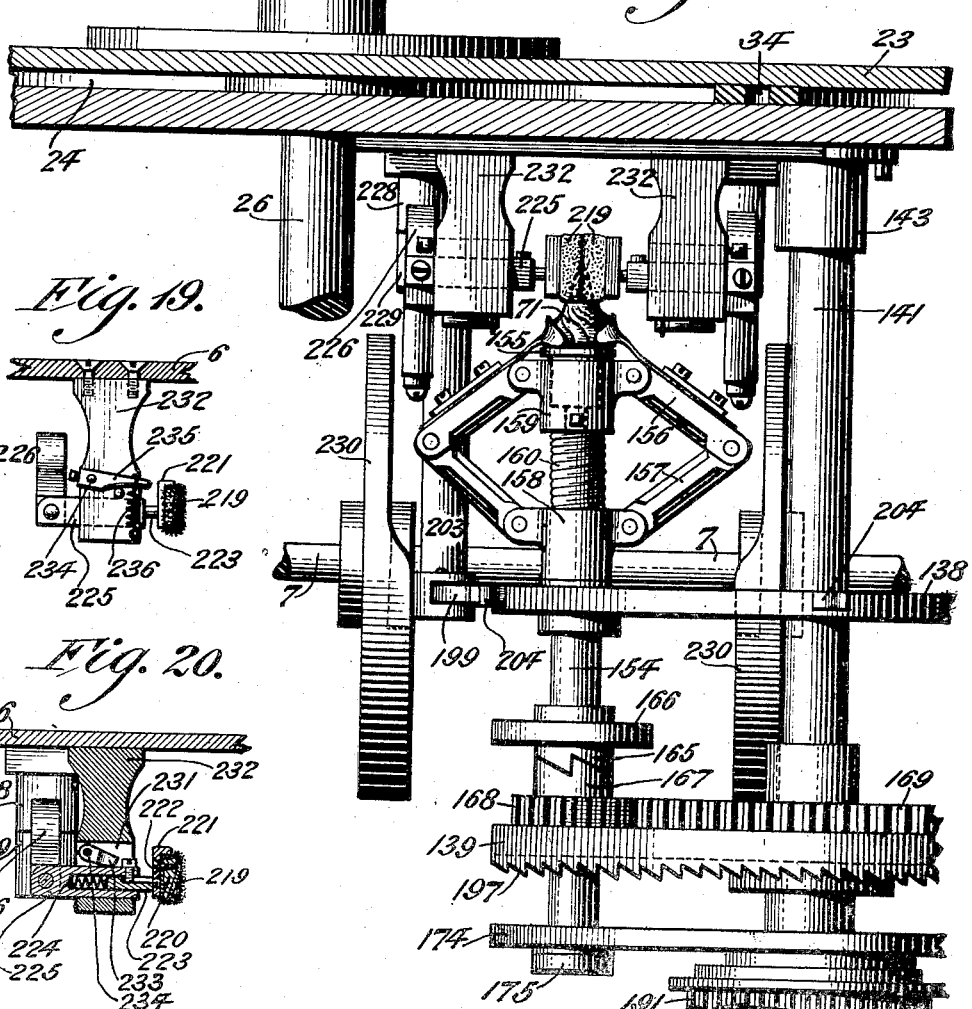

L. H. WILBUR.
WRAPPING MACHINE.
APPLICATION FILED OCT. 24, 1914.
1,131,881.
Patented Mar. 16, 1915.
15 SHEETS—SHEET 13.
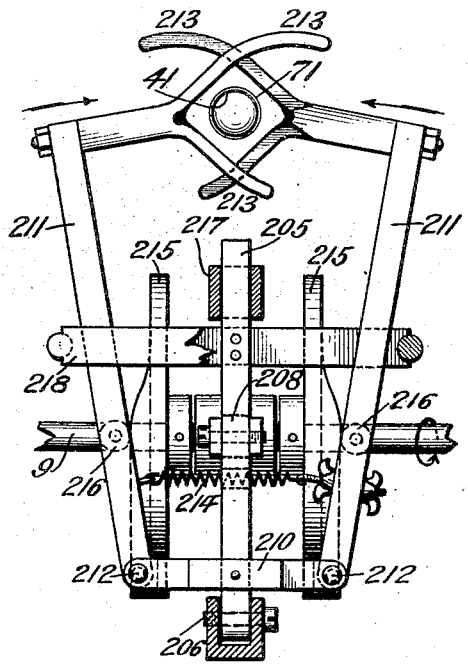
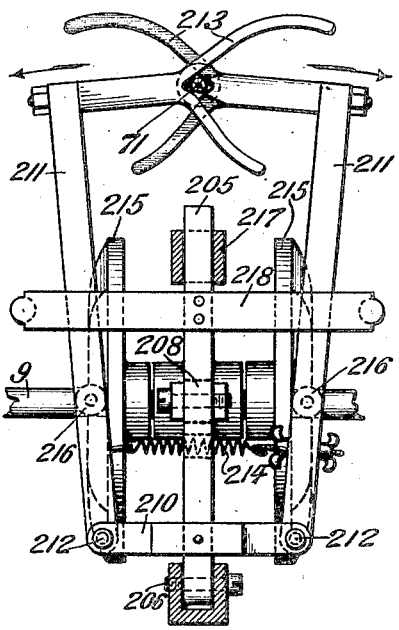
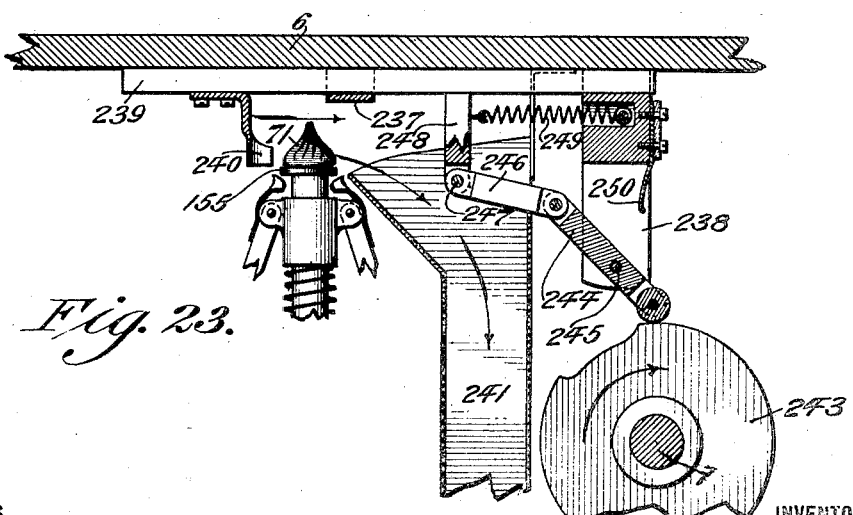

L. H. WILBUR.
WRAPPING MACHINE.
APPLICATION FILED OCT. 24, 1914.

1,131,881.

Patented Mar. 16, 1915.
15 SHEETS—SHEET 14.

WITNESSES
L. Douville,
P. F. Nagle.

INVENTOR
Lawrence H. Wilbur.
BY Wiedersheim Fairbanks
ATTORNEYS

L. H. WILBUR.
WRAPPING MACHINE.
APPLICATION FILED OCT. 24, 1914.
1,131,881.    Patented Mar. 16, 1915.
15 SHEETS—SHEET 15.
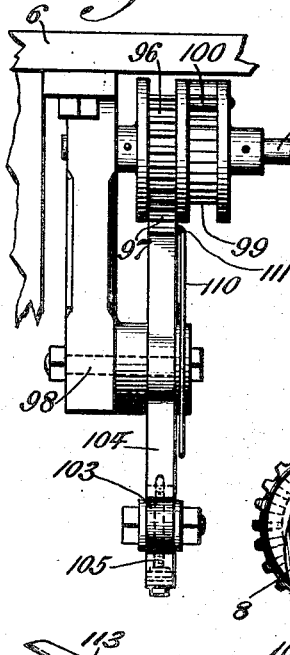
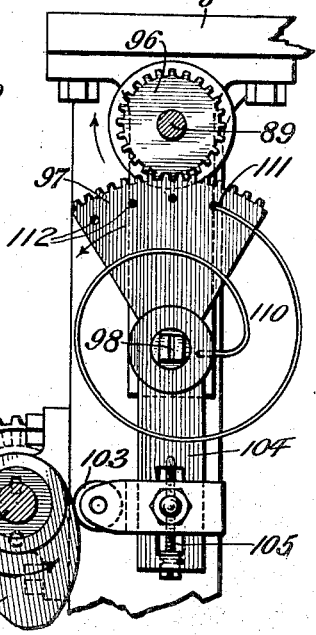
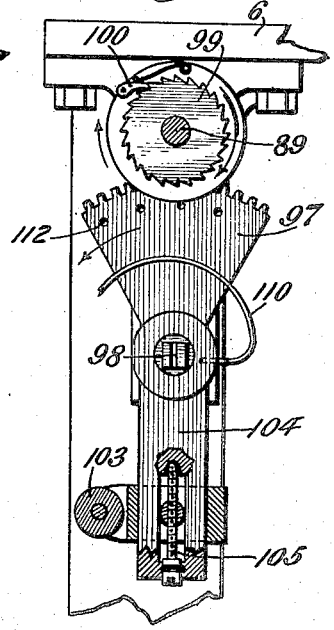
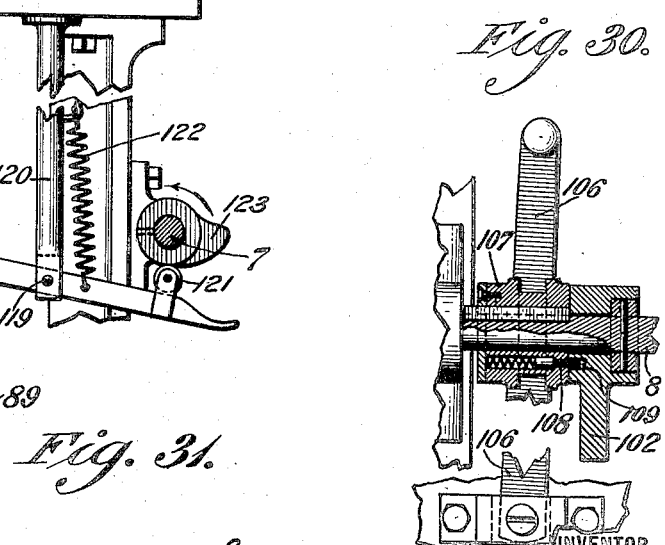
WITNESSES
INVENTOR
Lawrence H. Wilbur.
BY
ATTORNEYS

UNITED STATES PATENT OFFICE.

LAWRENCE H. WILBUR, OF PHILADELPHIA, PENNSYLVANIA, ASSIGNOR TO H. O. WILBUR & SONS, INC., OF PHILADELPHIA, PENNSYLVANIA, A CORPORATION OF PENNSYLVANIA.

WRAPPING-MACHINE.

1,131,881.   Specification of Letters Patent.   Patented Mar. 16, 1915.

Application filed October 24, 1914. Serial No. 868,387.

*To all whom it may concern:*

Be it known that I, LAWRENCE H. WILBUR, a citizen of the United States, residing in the city and county of Philadelphia, State of Pennsylvania, have invented certain new and useful Improvements in Wrapping-Machines, of which the following is a specification.

My invention relates to the class of machines which are employed for the wrapping or enveloping with tin-foil of what are known in the trade as chocolate "buds," or kindred special confections or articles of approximately conical shape.

My present invention is an improvement upon the wrapping machine invented by me and patented November 1, 1910, under United States Letters Patent No. 974,453, granted H. O. Wilbur & Sons, incorporated, to which patent reference is made.

The general organization of my present, as well as of my former, machine, comprehends coöperating mechanisms or devices which perform certain essential functions, namely:—means for intermittently revolving a pocket-provided, bud-carrying disk, the pockets of which are manually filled with buds placed base downward;—means for feeding beneath the bud-filled pockets as they are successively presented, a strip of tin-foil;—means for cutting the strip step by step to squares of a desired size;—means for plunging the buds seriatim with a square of foil beneath the base of each, upon a toggle-carrier and in so doing forcing the foil into tubular or cylindrical shape about the sides of the bud;—means for twisting-in or compressing about the sides of the bud the foil so formed up;—means for completing the foregoing action by further twisting or compressing the foil about the crown or apex of the bud;—and means for ejecting the wrapped buds from the machine.

The primary object of my present invention is to improve the machine of my former patent by increasing its efficiency and capacity, by rendering its operation more positive and rapid, and by adapting to it certain devices which enable me to apply to the chocolate bud beneath its base and within its tin-foil wrapper, a label of paper or other preferred material upon which may be inscribed the name of the manufacturer, the trade name of the article, the trade-mark of the proprietor, or other desired markings.

Further objects of my invention are to improve the general construction of my former machine so as to eliminate the use of wrapping paper within the tin-foil, to accurately control the feed of the tin-foil and also the operation of the bud-carrying toggles or toggle-carriers, and to assure the closest possible and most effective twisting-over and wrapping of the foil about the bud, and the positive ejection or discharge of the latter from the carrier.

With these and other ends in view, my invention consists in the novel constructions, combinations, locations, arrangements and modes of operation, of the parts or conjunctive elements, represented in the accompanying drawings, hereinafter described and specifically recited in the claims.

Figure 24:
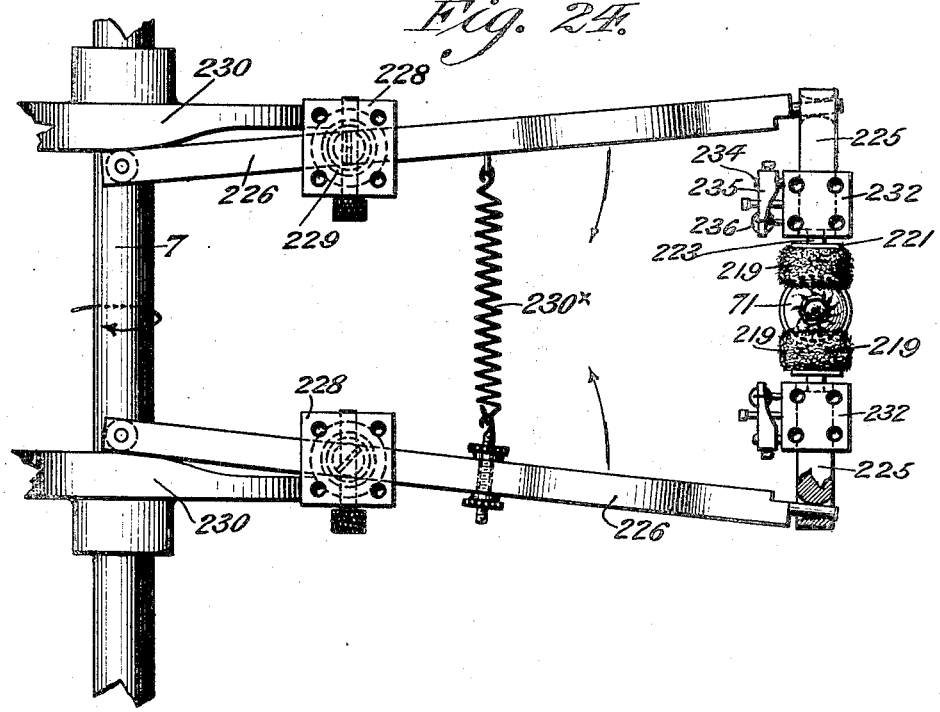
Figure 25:
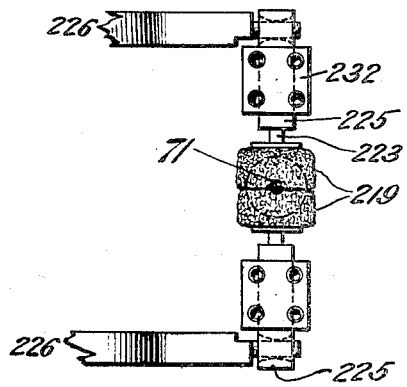

In the accompanying drawings which represent a preferred form of a machine embodying my invention—Figure 1, Sheet 1, is a top plan view of the machine in its entirety. Fig. 2, Sheet 2, is an elevation of the front of the machine, sight being taken in the direction of the arrow $y$ on Fig. 1. Fig. 3, Sheet 3, is an elevation of the back of the machine, sight being taken in the direction of the arrow $x$ on Fig. 1. Fig. 4, Sheet 4, is an elevation of the left hand side of the machine, sight being taken in the direction of the arrow $z$ on Fig. 1. Fig. 5, Sheet 5, is an elevation of the right hand side of the machine, sight being taken in the direction of the arrow $w$ on Fig. 1. Fig. 6, Sheet 6, is a vertical, sectional, front elevation through the label magazine and portions of the label-suction devices which serve to suck or draw down the labels from the magazine into the bud pockets of the intermittently revoluble bud-carrying or feeding disk. Figs. 7, 8, 9 and 10, Sheet 6, are fragmentary views, partly elevational and partly sectional, of component elements or members of the label-sucking devices. Fig. 11, Sheet 7, is a vertical, sectional, front elevation through the foil-feeding rollers, the bud-plunger and one of the toggle-carriers for feeding the buds. Fig. 12, Sheet 8, is a front elevational view, partly sectional, of portions of the bud-plunger, the turret, means for driving the turret, the knocker arm, one of the toggle-carriers, the foil-feeding rollers, and means for driving them. Fig. 13, Sheet 9, is a top plan view illustrating the anchor ring, the turret checks, the holding-down arm and portions of the turret-operating rack and connections. Fig. 14, Sheet 10, is a front elevational view, partly sectional, of the turret, the turret shaft, a pair of the toggle-carriers extended and unclutched, the clutches on said carriers, the turret-operating rack-bar and various gearings hereinafter described. Fig. 15, Sheet 11, is a fragmentary, left-hand side elevational view, partly sectional, illustrating one of the toggle-carriers compressed and clutched, the gear and ratchet connections operating the turret, the foil-compressing fingers and rockers, and the lifting cam for lifting them. Fig. 16, Sheet 11, is a fragmentary side elevation of a ratchet and pawl connection of the turret. Fig. 17, Sheet 12, is a front elevational view of a portion of the turret and bud-carrying disk, illustrating also a portion of the foil-bumpers and the bumper cams. Fig. 18, Sheet 12, is a right-hand side elevational view of one of the bumper-levers more particularly illustrated in Figs. 24 and 25. Figs. 19 and 20, Sheet 12, are fragmentary details, partly in section and partly in elevation, of one of the foil-bumpers. Figs. 21 and 22, Sheet 13, are top plan views of the foil-compressing fingers and rockers and their operating cams and springs,—Fig. 21 showing the fingers separated and Fig. 22 showing them compressed to encompass a bud and compress upon it the foil. Fig. 23, Sheet 13, is a left-hand side elevation, partly sectional, of the knocker-off or device for ejecting a wrapped bud from a toggle-carrier into the discharging chute. Fig. 24, Sheet 14, is a top plan of the foil-bumpers, bumper-levers and their operating cams and spring, shown removed from the machine and in the separated position of the bumpers. Fig. 25, Sheet 14, is a fragmentary plan of the foil-bumpers and the free ends of their operating levers broken off and in the position which they occupy when compressed or forced together upon the bud. Figs. 26, 27 and 28, Sheet 15, are detailed views of the rocking toothed-segment which operates the foil-feeding rolls,—Fig. 26 being a back elevation and Figs. 27 and 28 left hand side elevations. Fig. 29, Sheet 15, is a left-hand side elevational view of the foil-cutting knife. Fig. 30, Sheet 15, is a fragmentary, sectional, elevation of a clutch to throw the operating cam of the rocking toothed segment of the foil-feeding rollers into or out of operation. Fig. 31, Sheet 15, is a fragmentary, partly sectional, right-hand side elevational view of the ratchet gear particularly represented in Fig. 26, with its members separated. Fig. 32, Sheet 3, is a fragmentary, sectional detail of the brake mechanism which controls the foil-feeding rolls. Fig. 33, Sheet 3, is a fragmentary edge-sectional detail on the dotted line v—v of Fig. 34, through parts of the movable and fixed members of the supporting bracket for the tin foil reel. Fig. 34, Sheet 3, is a fragmentary, side-sectional detail on the dotted lines u—u of Fig. 33, through the same parts. Fig. 35, Sheet 4, is a fragmentary plan of a portion of the top plate of the frame and the ring which encompasses the bud-carrier, illustrating the carrier lock. Fig. 36, Sheet 4, is a fragmentary detail, partly sectional and partly elevational, of the bud-carrier lock, illustrating in particular the rocking lever and cam which operate it. Fig. 37, Sheet 5, is a top plan of the top disk of the turret, showing the lugs for the toggles and the turret check. Figs. 38 and 39, Sheet 5, are fragmentary details of the turret check and the compressed spring which controls its movement relatively to its fulcrum. Fig. 40, Sheet 2, is a fragmentary, front, sectional elevation of the clutch which controls the driving pulley. Fig. 41, Sheet 2, is a fragmentary detail of the toggle-spring resisting arm. Fig. 42, Sheet 3, is a fragmentary detail of the rack-bar for operating the turret.

Similar numerals of reference indicate corresponding parts.

Referring to the drawings:—the frame of the machine consists of the bed plate 1, standards 2, 3, 4 and 5 and top plate 6.

*The shafts and their functions.*—Journaled across the front of the machine is a horizontal shaft, which I designate the front shaft 7, to distinguish it from a horizontal shaft journaled and extending across the left-hand side of the machine, which I designate the side shaft 8, and also from a horizontal shaft journaled and extending across the back of the machine, which I designate the back shaft 9. The front shaft 7 is driven through the spur gears 10 and 11, by a driving shaft 12, journaled in the framework, and operated by a fast and loose driving pulley 13, and driving belt 14. A cone clutch 15 illustrated in Fig. 1 and in Fig. 40, Sheet 2, and operated by the double ended lever 16 controls the rotation of the driving shaft. A hand wheel 17 on the front shaft 7 permits of the manual operation of said shaft when desired. The front shaft 7 and side shaft 8 are connected through the bevel gears 18 and the side shaft 8 and back shaft 9 through the bevel gears 19.

20 designates a countershaft paralleling and journaled below the back shaft, as indicated in Fig. 3, and driven by said shaft through the intervention of spur gears 21 and 22, as indicated in Figs. 3 and 5.

The functions of the several shafts are as follows:—The front shaft 7 is the instrumentality which not only imparts rotation to the side, back, and counter, shafts, but also conjunctively occasions the intermittent stoppage of the rotation of the turret, the operation of the bud-ejecting devices, the bud plunger and the foil-cutting knife. The side shaft 8 operates the devices which supply the labels to the buds,—certain of the devices which control given movements of the toggle carriers,—and the devices which drive and control the foil-feeding rolls. The back shaft 9 drives the countershaft 20, and operates the devices which occasion the intermittent rotation of the bud-carrying disk, those which exert the first compression of the foil about the sides of the bud, the devices which occasion the intermittent operation of the bud-carrying disk, and the devices which lock its rotary movement step by step. The countershaft 20 operates the devices which impart to the turret its movements of step by step but continuous rotation,—and the devices which, through intermittent connections, operate the toggle-carriers of the turret to effect their stop and start rotations.

*The bud-carrying disk and connections.*— 23 designates the bud-carrying disk or bud-carrier, being an intermittently revoluble circular plate or disk upon the top of the frame and conveniently resting peripherally upon a flat circular ring 24, Figs. 35 and 36, Sheet 4. This bud-carrier is circumferentially and near its peripheral edge perforated or pierced with a series of equidistantly spaced bud-pockets 25, which as the disk revolves are manually filled with the chocolate buds to be wrapped, placed base downwardly so as to rest upon and travel along the ring.

The means for rotating the bud-carrier are the following:—Referring to Figs. 1, 2, 3, and 17,—26 designates a rotatable shaft, stepped at 27 upon the bed plate 1, extending through the top plate 6 of the frame, and locked or fastened to the bud-carrier 23, so as, when itself intermittently rotated, to impart intermittent revolution to said bud-carrier. 28 designates a ratchet wheel keyed to the disk shaft 26 below the top plate of the frame and adapted to occasion the intermittent rotation of said shaft and revolution of said bud-carrier through the intervention of a ratchet arm 29, Fig. 1, to which is connected the spring-controlled pawl 30, and which interiorly surrounds and is adapted to swing with respect to the shaft 26 as a pivot, and exteriorly is connected by the connecting joint 31 with an eccentric rod 32 operated by an eccentric 33 on the back shaft 9.

The means for locking the bud-carrier are the following:—Referring to Figs. 1, 3, 35 and 36,—34 designates a series of locking sockets, equidistantly spaced circumferentially of the bud-carrier on its under surface, and at distances apart correspondent to those of the bud-pockets 25. 35 designates a locking pin, movable within a vertical bearing 36 beneath the top-plate of the frame, and adapted to be raised into or withdrawn from the sockets 34,—as, in the revolution of the bud-carrier, they are successively presented,—through the medium of a lever 37 positively operated by a cam 38 on the back shaft 9, and controlled by a spring 39.

*The label-applying devices.*—Referring to Figs. 1, 2, 3, 4, 5, and 6,—40 designates the label magazine vertically erected upon a bracket 39 above the top plate of the frame, and designed to be manually filled with a stack of labels 41, which it is one of the objects of my invention to insert one by one beneath the bases of the buds, so as each to be encompassed within and wrapped over by the foil about the bud. The magazine, as the drawings indicate, is so disposed relatively to the bud-carrier, that each of the bud pockets is successively brought into alinement beneath its lower discharging opening, which, as shown in Fig. 6, has an inwardly projecting flange 42 upon which the stack of labels rest. In the rotation of the carrier disk in the direction of the arrow upon it shown in Fig. 1, an empty bud pocket is assumed to be brought into line beneath the magazine so as to receive a label before the pocket is supplied with the bud which the operator places upon the label. The pockets having, therefore, one after another been filled with the labels upon which the buds have been placed, are carried around to beneath the bud plunger or device which follows the labeled bud down upon the square of tin foil which is to be wrapped about said labeled bud,—all as hereinafter explained.

The devices for applying the labels are operated by suction and are particularly illustrated in Figs. 4, 6, 7, 8, 9 and 10. 43 is a bushing adapted to be moved vertically within a bushing aperture 44 through the top plate 6 and the ring 24 of the frame by means of a bushing link 45. This link is pivoted to a link-head 46 fast upon the exterior of a sleeve 47 which has a sliding up and down movement within the hollow bore 48 of the bushing 43. 49 is a bushing lever to which the lower end of the bushing link 45 is pivoted, and which is itself fulcrumed at 50 and operated by a cam 51 on the side shaft 8. 52 is a spring to counteract the thrust of the cam 51 in the tilting of the lever with respect to its fulcrum,— the cam alternately raising and lowering the bushing link within a predetermined distance, and through said link the link heads 46, the sleeve 47, and the label bushing 43. The label bushing 43 is chambered at 53, at its upper end (see Figs. 6, 8, and 9), so as to receive the nozzle head 54, Fig. 10, which is of smaller external diameter than the internal diameter of the chamber, and which is provided with a tubular apertured spindle 55, the lower end of which is threaded within the upper end of the sleeve 47. 56 is a tubular recess formed within the label bushing 43 and surrounding the spindle of the nozzle head. 57 is what I term the nozzle tube, which is connected with the lower end of the sleeve 47 and passes downward through a stuffing box 58 into a valve piping 59, composed of sections of hollow tubes and connecting unions which it is unnecessary to describe, but which are shown in Fig. 6. 60 is a valve for connecting or disconnecting the hollow interior of the valve piping 59, and particularly the chamber 61 therein into which the open lower end of the nozzle tube 57 extends and terminates, with a connecting tube 62, which leads through pipe connections 63 to a suction tank 64, Fig. 4. Obviously, when the valve 60 is opened, the vacuum created through the operation of the suction tank will extend through the chamber 53 within the label bushing 43, the tubular recess 56 in said bushing, the apertures of the spindle 55 of the nozzle head 54, the sleeve 47, the nozzle tube 57, the valve piping 59, and the pipe connections 63, so as to occasion a continuous draft or suction around the nozzle head. When, then, the nozzle head and its bushing are by the action of the cam 51 and lever 49, in the position represented in Fig. 8, the suction will cause the drawing down of the lowermost label of the stack within the magazine upon the nozzle head, until by the further action of said cam and lever the nozzle and bushing being drawn down into the position represented in Fig. 9, the label will as to its peripheral edges be turned up within the bud pocket of the bud carrier, as shown in Fig. 9, and in such position, will remain until in the rotation of the carrier in the direction of the arrow represented in Fig. 1, said pocket shall, as hereinafter explained, have become alined beneath the bud plunger. The desired raising and lowering of the nozzle head and bushing through the operation of the cam 51 and lever 49, are intermittently but continuously performed throughout the period of the intermittent but continuous rotation of the bud carrier. In order, at the proper times, to create the requisite suction throughout the air passages between the valve 60 and the bushing chamber 53, it will be apparent that the valve must be opened and closed in predetermined consonance, with the movements of the nozzle head and bushing. This movement of opening and closing of the valve 60 at the appropriate times, is accomplished through the cam crank 65 connecting link 66 and the spring controlled cam-rocker 67 operated upon by the cam 68 on the side shaft 8, as shown in Figs. 2 and 7.

*The foil feeding mechanisms.*—Referring to Figs. 1, 2, 3, 4, 11 and 12,—69 is a bracket for supporting the foil-carrying reel 70 from off which the foil 71 is carried in the direction of the arrows shown in Fig. 3, to the foil-feeding rolls 72 and 73. In order to permit of the exact adjustment of the foil-carrying reel 70, so that its axial disposition may be nicely determined, its axle 74 is dropped within axle bearings 75, Figs. 33 and 34, formed in the movable top members 76 of the bracket 69. There being two of these top members, as Fig. 1 indicates, and each of them being adjustable with respect to the fixed members which constitute the bracket proper 69, by means of a slot and bolt connection 77, the adjustment is rendered easy and accurate. To prevent the too rapid unwinding of the foil from off the carrying roll 70, I employ a brake mechanism (Figs. 1, 2, 3, and 32) which consists of two pivotally swinging brake arms 78 and 79 connected by the carrying block 80 with the bracket 69, and each provided with a segmental braking surface 81 and 82, adapted to bear upon the roll and to be locked together by the swinging nut lock 83. 84 designates a swinging arm which carries a slack-counteracting roll 85 to render taut the strip of foil in its movement between the carrying reel and the feeding rolls. 86 is a directing guide plate over which the advance end of the strip of foil passes before it enters between the feed rolls 72 and 73.

Referring to Figs. 11 and 12, 72 and 73 respectively designate the upper and the lower foil feeding rolls carried upon shafts 88 and 89 in a frame 87 connected with or being a part of the frame of the machine. 90 and 91 are counterpart spur gears respectively employed to drive the upper and lower foil-feeding rolls, the upper gear 90 being driven by the lower gear 91, which itself is driven by means represented in Figs. 26, 27, 28, 30 and 31, hereinafter referred to. 92 is a lever connected with an eccentric 94 on a shaft 93, which, through links 95 is adapted to raise the shaft 88 of the upper foil-feeding rolls 72, so as to lift said roll sufficiently clear of the lower foil feeding roll 73 to permit of the manual movement of the strip of foil between their separated driving surfaces. This is simply a device for the convenience of the operator in the adjustment of the foil.

Referring to Figs. 26, 27, 28, 30, and 31,—96 is a spur pinion free upon the shaft 89 of the lower foil-feeding roll 73, which is shown as in engagement with the rocking toothed segment 97, pivoted at 98, so as, in the oscillation of the segment, to be intermittently rotated first in one and then in the other direction. Fixed upon the same shaft 89, is a ratchet wheel 99, the spring-controlled pawl 100 of which is laterally disposed upon and carried by the spur pinion 96. Obviously, the oscillation of the rocking segment 97, in the direction of the arrow represented upon it in Figs. 27 and 28, will, through the spur pinion 96, occasion the rotary movement of the shaft 89 in the direction of the arrow represented upon it, with the result that through the segment, ratchet wheel and pawl, the driving foil-feed roll 73, will have imparted to it a limited rotary movement which through the gears 90 and 91, will occasion the opposite rotation of the foil-feeding rolls in the direction of the arrows upon them in Fig. 11, with the further result of feeding forward the strip of foil 71 in the direction of the arrow upon it in said figure, into the foil slot 101 formed between the carrier plate beneath the periphery of the bud carrying disk and the upper peripheral surface of the top plate of the frame, and in a radial direction below the bud-plunger 124 hereinafter described.

As it is desired to occasion the forward feed of the strip of foil intermittently and for only a limited distance at a time, it is apparent that the foil-feeding rolls must be intermittently stopped. This I accomplish by the reverse oscillation of the rocking segment 97, with the result that the pawl 100 slips backward over the ratchet wheel 99 until the reverse throw of the segment ceases.

Each of the oscillatory, or forward and back, movements of the rocking segment to accomplish the intermittent operation of the foil-feeding rolls, is effected by the fast and loose segment-cam 102, Figs. 27 and 30, upon the side shaft 8, which treads against a cam roller 103 connected with the dependent arm 104 of the rocking segment 97, to which it is adjustably connected by means of the adjusting screw 105, as shown in Figs. 27 and 28. This adjustment, as will be understood, is simply for the purpose of precisely limiting the throw of the segment to precisely adjust the feed of the foil-rolls.

In order to enable the operator, at will, to throw the foil-feeding rolls out of operation, I provide appropriate means for throwing the cam 102 of the rocking segment 97 into or out of clutch with the continuously rotating side-shaft 8. This means is shown in Fig. 30, and preferably consists of a clutch lever 106, shown also in Fig. 4, which is adapted to throw a sliding collar 107 upon the side shaft 8 from right to left in said Fig. 30, so as to release a spring pin 108 carried by the collar and projecting laterally therefrom, from a pin-socket 109 formed in the side face of the cam 102. The cam 102, as explained, being free upon the shaft 8, and only revolving with the revolving collar when locked by the pin, of course ceases to revolve when released from the pin.

110 (Figs. 26, 27, and 28) is a coiled spring,—adjustably connected as to one of its ends, by an inverted-end 111, with notches 112 in the side face of the rocking segment, and as to the other end fixedly connected with the frame,—which serves to assure the balance of the rocking segment about its pivot and maintain the roller 103 in contact with the cam 102.

*The foil-cutting mechanism.*—In Figs. 5, 11, 12, and 29,—I show a foil-cutting mechanism consisting of a pair of shears having a movable blade 113 and a fixed blade 114, the object of which is to cut the advance end of the strip of foil as it is intermittently fed forward, into squares of appropriate dimensions for enwrapping the bud. The fixed blade, as shown in Figs. 11 and 12, is affixed to a vertical slot 115 in the top plate 6 of the frame, and the movable blade is pivoted at 116 within said slot, and opened and shut with respect to the fixed blade by a lever 117, connected with it at its outer end by a link 118, fulcrumed at 119 to a hanger 120 from the top plate, and at its inner end provided with a cam roller 121, in contact through the medium of a coiled spring 122, with a shears cam 123 on the front shaft 7 of the machine. As the cam 123 rotates in the direction of the arrow, Fig. 29, with the front shaft, the shears will obviously be opened and closed.

*The bud-plunging mechanism.*—In Figs. 1, 2, 3, 4, 5, 11, and 12,—I have illustrated a means for forcing the buds, one after another, through the pockets in the bud-carrying disk, in which they have been manually placed so as to rest upon the labels, as, in the rotation of said disk, said pockets are successively presented,—and downwardly, with the labels beneath them, upon the successively presented squares of cut tin-foil, in such manner, as first, to force up the squares of tin foil around the sides of the buds into the tubular form illustrated in Figs. 11 and 12, and then, to deposit the buds so enfoiled upon the toggle-heads of the toggle-carriers. For the performance of these operations, I employ what I term a bud-plunger 124, erected vertically in slide bearings 125, formed upon a bracket 126 upon the frame, and adapted to be raised and lowered by means of a walking beam 127, pivoted at 128, upon a standard 129. The inner end of the walking beam is connected by links 130 with the bud-plunger, and its outer end is connected by links 131 to a vertical slide bar 132, adapted to be moved up and down through a housing 133 upon the frame, by the action of a side cam 134 on the front shaft 7, within a side-groove 135 in which is entered and travels a cam roller 136 on the lower end of the slide bar 132, as the cam revolves in the direction of the arrow in Fig. 4. Obviously, the operation of the cam 134 will, through the foregoing devices, be to occasion the rocking of the walking beam, and through it the properly timed raising and lowering of the bud-plunger 124. 137 is a socket on the lower end of the bud-plunger, which, in the up and down movement of said bud-plunger, is, alternately, as in Fig. 12, elevated clear of and, as in Fig. 11, caused to pass downward through a tubular guide 138ˣ, attached to the under surface of the top plate of the frame.

*The toggle-carrying turret and means for operating it and the toggle-carriers.*—In Figs. 1, 2, 3, 4, 5, 11, 12, 14, 15, 16, and 17,—I have illustrated what I term the turret or device, mounted upon and in connection with which the bud-carrying toggles or toggle-carriers operate to present the buds when labeled and encompassed by the foil forced up and formed into an open topped tube surrounding their sides, as already explained, to the action, first, of the means for twisting in or compressing about the sides of the bud the foil so cylindrically forced up and formed, and second, the means for completing the foregoing action by further twisting in or compressing the foil about the crown or apex of the bud, before the device for ejecting the wrapped buds from the machine is brought into action.

The organization of the elements which perform the foregoing operations, is as follows:—138 designates the top disk and 139 the bottom disk, which, when bolted together by the connecting posts 140, constitute the turret proper. 141 is a vertical turret-shaft stepped in a lower bearing 142 on the bed plate and journaled within an upper bearing 143 on the undersurface of the top plate of the frame. 144 is a supporting bushing keyed to the turret shaft upon which the bottom disk 139 and the connecting posts and top disk rest. The turret shaft is caused to rotate continuously in the direction of the arrow s upon it, through the bevel gear wheel 145, Figs. 3 and 14, fastened near its base. This gear wheel 145 is engaged with a bevel pinion 146, Figs. 2 and 3, upon a cross shaft 147 journaled in the frame and carrying the toothed spur pinion 148, which through a train of idle gears 149, 150, and 151, Fig. 4, in turn driven by the toothed driving spur wheel 152 on the countershaft 20, drives said gear wheel 145.

In the organization of my present machine, the turret is provided with four toggle-carriers each of similar construction, and each component of the same parts, constructed, combined and operated, in the same manner, so that the following description of one of them will suffice:—Suitably journaled through the top and bottom disks 138 and 139 of the turret, is a toggle shaft 154, topped with what I term a toggle head 155, upon which as already explained and as shown in Figs. 11 and 12, the bud encompassed with the foil and labeled is superimposed by the bud-plunger. 156 are the upper counterpart members and 157 the lower counterpart members of the four links or levers, as they may be termed, which together compose each of the toggle carriers and which are jointed together in a manner particularly represented in Figs. 11, 12, 14, 15 and 17, that will be understood by any mechanic. Each pair of lower members of the toggles is pivoted to a rotatable bearing 158 upon a toggle shaft above the top disk of the turret,—and each pair of upper members of said toggle is pivoted to a sliding bearing 159 on the toggle shaft. Between the bearing 158 and the bearing 159, and encircling the toggle shaft, is a spiral toggle spring 160 which serves, after the compression of the toggles from the position represented in Figs. 11 and 14, to that represented in Figs. 12 and 17, as hereinafter explained, to extend them to their expanded position. The sliding bearing 159 of the toggle carrier is formed with a recess 161, within which the toggle-head 155 is adapted to move vertically up and down. 162 is a stem of the toggle-head extending downwardly within a tubular socket 163 formed in the upper portion of the toggle shaft 154, and containing within it an internal spiral spring 164 which is adapted to force the toggle-head up into the position represented in Fig. 14, after it has been compressed by the bud-plunger into the position represented in dotted lines in Fig. 12. 165 is the upper member of a clutch fast on the toggle shaft and provided with a circumferential rim 166, and 167 is the lower member of said clutch free on the toggle shaft just above the bottom disk 139 of the turret. This lower member of the clutch is externally provided with a gear pinion 168, which is engaged with the gear wheel 169 fixed on and rotated with the turret shaft. Obviously, the constant rotation of the turret shaft and its gear wheel 169, will occasion the constant rotation of the lower member of the clutch without occasioning the rotation of the toggle-shaft until the latter, through the instrumentality of the clutch member 165 and its rim 166, is depressed so as to lock together the two clutch members 165 and 167, with the result of rotating the toggle carrier.

The rotation of the toggle-carriers in conjunction with the twisting and wrapping devices hereinafter described effects the twisting and close wrapping of the foil about the buds, and is, in the rotation of the turret, occasioned by the pressing down of the toggle-head, toggle shaft, and toggles, from the position represented in Figs. 11, and 14, to that represented in Figs. 12, 15, and 17, to lock the clutch, by the encounter and downward movement and pressure of what I term a toggle-lowering arm 170, Figs. 2, 3, 11, 12 and 13, which is pivoted at 171 to the side of the frame and is caused to be tilted or raised and lowered with respect to its pivot by the action of a toggle-lowering cam 172, Fig. 12, on the side shaft 8.

The arm 170 has a spring-controlled jointed toe 176, Figs. 11 and 12, to assure yielding contact with the clutch rim 166.

The cam 172 bears against a cam roller 173 on the arm 170,—and by its action and through the arm 170 and the rim 166 of the upper member 165 of the clutch, occasions the locking of the two clutch members and the rotation of the toggle shaft.

A further function of the toggle-lowering arm 170, is, through the upper member 165 of the clutch, to depress the toggle shaft 154, while the turret is revolving, the upper and lower members of the clutch engaged and the toggle carriers rotating,—so as with said shaft to depress a collar 175 on the bottom of the toggle-shaft until said collar engages beneath the horse-shoe-shaped anchor ring 174, Fig. 13, fixed in the frame, and in the continuing revolution of the turret so remains beneath said ring until, in the operation of the machine, the time has arrived for its release from beneath said ring, to permit the toggle spring 160 to expand the toggles into the positions shown in Figs. 11 and 14.

By reference to Fig. 13 it will be observed that the anchor ring 174 is a circular or horse-shoe shaped plate the ends 179 and 185 of which terminate in such manner as to leave an open space 177 between them, and that its length is such that in the position of the parts depicted in said Fig. 13 two of the toggle carriers in the rotation of the turret are simultaneously held down beneath it by their collars 175.

During the period of the compression of the toggle carriers, as indicated in Figs. 12, 15 and 17, two devices connected with the upper members 156 of the toggles, which I term the toggle clamping fingers 178, are thown inwardly so as to bear against the uwardly extending tubularly shaped foil about the sides of the bud, with the result that they prevent the foil and bud from being thrown out by the centrifugal force of the rapidly rotating carriers.

Referring to Fig. 13,—as, one by one, the toggle carriers travel beyond what I term the terminal end 179 of the anchor ring, the circumferential rims of the upper members of their clutches pass, one by one, beneath the free end of what I term the toggle-spring resisting arm 180, Figs. 2, 13, and 41, which is a device for controlling and preventing the too rapid separation of the members of the clutch, the too rapid expansion of the toggle spring 160 in the toggle carrier, and the consequent too rapid expansion or straightening out of the toggle members of said toggle carrier. This toggle-spring resisting arm 180 is pivoted at 181 to the frame and operated by a cam 182 on the side shaft 8, which treads against a roller 183 on the arm and in its movement is counterbalanced by a spring 184, all as illustrated in Fig. 41.

It will now be understood in what manner the toggle carriers are, in the revolution of the turret, themselves rotated at the appropriate times and compressed and expanded.

In the preferred type of machine represented, in which the turret is equipped with four toggle carriers, the operation of the turret is one of intermittent revolution in quarter turns, to the end that in the position of the parts depicted in Fig. 13 two of the toggle carriers may be simultaneously held compressed during the period of the travel of their respective shaft collars beneath the anchor ring, while two are permitted to expand during the period of their travel between the terminal end 179 and the entering end 185 of said anchor ring. This intermittent 90 degree revolution of the turret is preferably effected by the following devices:—186 is a rack bar, Figs. 3, 13, 14 and 42, mounted for horizontal reciprocation in and through the bearings 187 on the standards 188 on the bed plate of the frame. This rack bar is driven in one direction by the cam 189 on the countershaft 20, and is driven or returned in the other direction by the spiral spring 190. The teeth of the rack bar engage with a toothed spur wheel 191 free upon the turret shaft 141 and rigidly connected with the four-toothed ratchet wheel 192 likewise free upon said shaft.

193 is a spring controlled pawl pivotally carried by the hanger 194 depending from and fixed to the bottom disk 139 of the turret and adapted to engage with the four teeth of the ratchet wheel 192. Obviously, in the rotation of the bottom disk of the turret, the pawl 193 will occasion the intermittent stoppage of the spur wheel 191 at each of its quarter turns, as it itself is given a quarter turn by the forward reciprocation of the rack bar; and, obviously also, the reverse movement will occasion the slipping back of the pawl to the next tooth of the ratchet wheel to place it in position to give the next turn to said ratchet wheel and consequently to the turret.

195, Figs. 13, 15, and 16, are spring-controlled turret checks mounted upon pivots 196 on the anchor ring which engage with ratchet teeth 197 connected with the bottom disk 139 of the turret and serve to check any reverse movement of the turret. 198 is a turret-retarding brake, best shown in Fig. 12, which bears upon the circumference of the bottom disk 139 of the turret and serves to retard or overcome the too rapid forward revolution of the turret.

199, see Figs. 17, 37, 38 and 39, is a turret lug lever, fulcrumed at 201 within the frame and controlled by a cam 200 on the shaft 7 and countercontrolled by a spring 202 in a housing 203. The cam 200 is so timed as to deflect the turret lug lever 199 out of contact with the stop lugs 204, on the periphery of the top disk 138 of the turret and permit of the intermittent quartering revolution of the turret under its driven means hereinbefore described, in the direction of the arrow upon said disk in said Fig. 37. The stop lugs in the organization represented are four in number and equidistantly disposed upon the periphery of the turret top disk, and serve to stop the turret in the appropriate quarter turn positions.

*The foil compressing fingers.*—Referring to Figs. 3, 4, 5, 15, 21 and 22,—the devices which I employ for compressing the foil from its open-topped tubular form about the basal sides of the bud, into the twisted closed-up form necessary to effect the first enwrapping at the conical or apex portion of the bud, are the following:—205 is a frame arm pivoted at 206 to the frame and adapted to be raised and lowered by the peripheral cam 207 on the backshaft 9 of the machine, the connection of the arm and the cam being through the medium of a cam roller 208 journaled in a hanger 209 depending from the frame arm and treading on the cam by the weight of the arm. Connected with the frame arm 205 by the cross arms 210 are a pair of finger-carrying levers 211 pivoted to the cross arm at 212. At their free inner ends the levers 211 are provided with opposing interdisposed fingers 213 inwardly extending in opposite directions from the inner ends of the levers, and overlapping each other in a manner which will be understood from Figs. 15, 21 and 22. These levers are connected by a spring 214 which serves to draw them together into the position represented in Fig. 22, after they have been separated as in the position in Fig. 21 by the action of a pair of side cams 215 mounted on the backshaft 9 and bearing against rollers 216 on the said levers. 217 is a slotted hanger depending from the top plate of the frame to steady the lift and drop of the frame arm 205, and 218 is a slotted cross bar connected with the frame arm for guiding the finger-carrying levers in their inward and outward throws. By further reference to Figs. 3, 5, and 15, it will be understood that in the operation of the foregoing devices, the foil-compressing fingers are lifted and dropped to clear, and moved inwardly and outwardly to compress, the open-ended tubular foil about the lower sides of the bud so as to partially complete its twisting or first compression about the upper sides and apex portion of the bud.

*The foil-bumpers.*—Referring now to Figs. 2, 17, 18, 24 and 25,—the devices which I employ to complete the ultimate wrapping of the foil over and about the apex of the bud, are a pair of oppositely disposed counterpart bumpers 219 which are adapted to be intermittently brought together and spread apart preferably to the bud. These bumpers are preferably formed of a piled material such as velveteen, which, as shown in Figs. 19 and 20, may be spread over what I term a bumper carrying plate 220 held by the screw 222 against the plate-base 221 erected on the slide 223 fitted within the socket 224. This socket is formed within a sliding bumper bar 225 which is itself connected with a bumper lever 226, pivoted at 227 to a rotatable hanger 229 in a tubular boss 228 depending from the top plate of the frame, as particularly shown in Figs. 18 and 20. There being, as will be understood, a pair of bumpers carried by a pair of bumper levers, counterpart in all respects, the movements of the levers in opposite directions to effect the counterpart inward and outward throws of the sliding bumper bars 225 and bumpers, will be effected by the rotation of the counterpart side-wiping cams 230 on the front shaft 7, opposing the contraction of the spiral spring $230^x$ between the levers. The sliding bumper bars 225 are each controlled in their sliding movements within the recesses 231 in the depending bosses 232, by the operation of toes 233 on rocker shafts 234 journaled within and extending through the bosses and externally thereof provided with rocker arms 235 controlled by springs 236. Obviously, the foregoing adjustments made possible by the assemblage and cooperation of the parts just described in connection with the lateral adjustability of the bumper levers 226 in their pivotal and, so to speak, ball-and-socket relationship to their hangers 229, render possible the most effectual operation of the pile faces of the bumpers relatively to the buds, to closely enwrap buds of slightly varying dimensions.

*The Bud-ejecting-devices.*—Referring to Figs. 1 and 23,—the means which I employ for the positive ejection of a completely wrapped bud from the toggle head of a bud carrier is the following:—Suitably housed in bearings 237 and 238 beneath the top plate of the frame, is a reciprocating slide which I term the knocker bar 239 which carries depending from it a knocking off lug 240 to effect, by encounter with the bud when moved in the direction of the arrow in Fig. 23, the positive ejection of the bud from off the toggle head into the discharging chute 241 and to the receiving box 242. The positive reciprocating movement of the knocker bar and knocker is conveniently occasioned through the operation of a peripheral cam 243 on the front shaft 7, which operates a lever 244 fulcrumed at 245 to the depending bearing 238 and connected by a link 246 pivoted at 247 to a lug 248 depending from the sliding knocker bar. The operation of the cam in the tilting of the lever and, through its link, in the reciprocating movement of the sliding knocker bar, is counteracted by a returning spring 249 linked between the lug 248 and the bearing 238. 250 is a guard spring to cushion the throw of the rocking lever 244 occasioned by the cam 243 and spring 249.

*The operation of the machine.*—Assuming that the operations of the several independent mechanisms which in their assemblage constitute the machine in its entirety have now been explained, the sequence in which these operations are performed may be stated:—The label magazine having been filled with its stack of labels and the foil-carrying roll supplied with its foil,—the machine, through its motive mechanism, is put in action, with the result that the prime-moving devices, the front shaft, side shaft, backshaft, and countershaft, are caused to rotate, and, through them, the bud-carrying disk with the buds in its pockets, the disk operating devices, the label-applying devices, the foil-feeding mechanisms, the foil-cutting devices, the bud-plunging mechanism, the toggle-carrying turret, the toggle carriers, the means for operating the toggle carriers, the foil-compressing fingers, the foil bumpers, and the bud-ejecting devices, set in motion and caused to operate. As each bud-carrying pocket is in turn presented to the label-sucking devices, they operate to suck a label into it, while the bud-carrying disk has stopped. After the bud-carrying disk has completed its first revolution and its pockets have been filled with labels and also with buds manually placed on the labels, it will continue to stop and start, so that, while stopped and at each stoppage, it will permit of the operation of the foil-feeding mechanism and foil-cutting devices to feed and cut off beneath each pocket a square of tin foil, and will then, when again started, present the buds manually inserted in the pockets upon the labels and cut squares of tin foil one after another to the bud plunger mechanism, so as to enable the latter to deposit or force the buds down upon the head of an extended toggle carrier, and, in so doing, force up the tin foil into open-topped tubular shape about the lower sides of the buds. The further movement of the disk will then occasion the travel of the bud so deposited and with the tin foil so extended upward about it, on the bud-carrier at the time extended and not rotating, until such time as said carrier in the revolution of the turret will, through the operation of the toggle lowering arm, have been compressed and caused to rotate, for the purpose of occasioning the clamping of the foil around the bud by the clamping fingers 178, and for the further purpose of carrying the bud so clamped to the position in which the foil-compressing fingers 213 will act upon the clamped foil on the bud to effect its initial twisting about the lower sides of the apex of the bud. It being understood that the turret revolves continually in one direction but in its revolution stops and starts in quarter turns,—the travel of the bud so deposited and with the tin foil so extended upward about it on a bud-carrier at the time extended and not rotating, will then continue with the carrier until such time as the turret in the first quarter turn of its revolution has caused the bud-carrier, by the operation of the toggle lowering arm, to have been compressed and caused to rotate, for the purpose of occasioning the clamping of the foil around the bud by the clamping fingers 178. The next or second quarter turn of the turret will then move the same toggle-carrier, still compressed and rotating, to the position in which the foil-compressing fingers 213 will act upon the clamped foil on the bud to effect its initial twisting about the lower sides of the apex of the bud. The next or third quarter turn of the turret will then move the same toggle-carrier, still compressed and rotating, into position to bring its bud into the field of operation of the foil-bumpers to effect the ultimate twisting or compression of the foil over and on top of the apex of the bud. The fourth or final quarter turn of the turret will then carry the toggle-carrier into a position to escape from the control of the anchor ring, so that said carrier will extend and, its clutch members having been released, will stop rotating and so, released, move the bud upon its head forward and into line with the path of movement of the knocking-off or bud-ejecting devices to throw the completely wrapped bud out of the machine. The quarter turns of the turret are, therefore:—first, that which brings a toggle-carrier under the action of the bud plunger to have its toggles compressed and clutched to occasion its rotation, and at the same time causes the foil to be turned up about the bud;—second, that which carries the compressed and rotating toggle-carrier into the plane of action of the foil-compressing fingers, to occasion the first twisting of the tubularly formed foil;—third, that which carries the still compressed and rotating toggle carrier into the plane of action of the foil bumpers, to occasion the final twisting or closing up of the foil over the apex of the bud;—and, fourth, that which carries the same carrier beyond the control of the devices which, as explained, have been causing its compression and rotation, and into the control of that which occasions the stoppage of its rotation by the release of its clutch and permits of its extension to lift the enfoiled bud up to and within the range of action of the ejecting mechanism; and, thereafter, carries said carrier farther along to almost the completion of its circular travel with the turret and through the toggle lowering devices occasions its further compression, clutching, and engagement with the devices which again set it in rotation.

It will, therefore, be understood that during the period of the "quartering" revolution, so to speak, of the turret, there will be a period or path of traverse over which two of the four toggle-carriers will be temporarily extended and another period or path of traverse during which another two of the toggle carriers will be compressed.

It will be further understood that the setting-up or "timing" of the cams to occasion the necessary sequences of movement of the various active instrumentalities to cause them properly to perform their respective functions, is within the power of the manufacturer to adjust.

Devices analogous or mechanically equivalent to those specifically described and represented, may at the option of the constructor and in the exercise of the skill of the workshop, be substituted for them.

Although throughout this specification, I have specifically referred to the chocolate "buds" of commerce, or kindred articles of approximately conical shape, as the things to be wrapped, and to tin foil as the wrapping material, I do not confine the uses of my machine to the wrapping solely of conically formed confections with tin foil, but contemplate its use in the wrapping of articles generically as such, although preferably confections and preferably conical, with any wrapping material structurally or inherently compressible and capable of coherence in compressed form.

It will now be apparent that I have devised a novel and useful construction which embodies the features of advantage enumerated as desirable, and while I have in the present instance shown and described a preferred embodiment of it, which has in practice been found to give satisfactory and reliable results, it is to be understood that the embodiment is susceptible of modification in various particulars without departing from the spirit or scope of the invention or sacrificing any of its advantages.

Having thus described my invention, what I claim as new and desire to secure by Letters Patent, is:—

1. A wrapping machine comprising a pocket-provided article carrier, means for placing a label within a pocket of said carrier within which pocket an article to be wrapped is placed, mechanism for encompassing the labeled article with wrapping material, and mechanism for compressing the wrapping material upon the labeled article.

2. A wrapping machine comprising a pocket-provided article carrier, means for placing a label within a pocket of said carrier within which pocket an article to be wrapped is placed, mechanism for encompassing the labeled article with wrapping material, mechanism for compressing the wrapping material upon the labeled article, and mechanism for ejecting the wrapped article from the machine.

3. A wrapping machine comprising a pocket-provided article carrier, means for placing a label within a pocket of said carrier within which pocket an article to be wrapped is placed, and mechanism for encompassing the labeled article with wrapping material, which first folds it then twists it and then compresses it upon the labeled article.

4. A wrapping machine comprising a pocket-provided article carrier, means for placing a label within a pocket of said carrier within which pocket an article to be wrapped is placed, mechanism for encompassing the labeled article with wrapping material, which first folds it then twists it and then compresses it upon the labeled article, and mechanism for ejecting the wrapped article from the machine.

5. A wrapping machine comprising a pocket-provided article carrier, a suction mechanism for drawing a label within a pocket of said carrier within which pocket an article to be wrapped is placed, means for operating the suction mechanism, mechanism for encompassing the labeled article with wrapping material, and mechanism for compressing the wrapping material upon the labeled article.

6. A wrapping machine, comprising a pocket-provided article carrier, a suction mechanism for drawing a label within a pocket of said carrier within which pocket an article to be wrapped is placed, means for operating the suction mechanism, mechanism for encompassing the labeled article with wrapping material, mechanism for compressing the wrapping material upon the labeled article, and mechanism for ejecting the wrapped article from the machine.

7. A wrapping machine, comprising a pocket-provided article carrier, a suction mechanism for drawing a label within a pocket of said carrier within which pocket an article to be wrapped is placed, means for operating the suction mechanism, plunging mechanism for encompassing the labeled article with wrapping material and folding it about said article, and mechanism for compressing the wrapping material upon the labeled article.

8. A wrapping machine, comprising a pocket-provided article carrier, a suction mechanism for drawing a label within a pocket of said carrier within which pocket an article to be wrapped is placed, means for operating the suction mechanism, plunging mechanism for encompassing the labeled article with wrapping material and folding it about said article, mechanism for compressing the wrapping material upon the labeled article, and mechanism for ejecting the wrapped article from the machine.

9. A wrapping machine, comprising a pocket-provided article carrier, a suction mechanism for drawing a label within a pocket of said carrier within which pocket an article to be wrapped is placed, means for operating the suction mechanism, plunging mechanism for encompassing the labeled article with wrapping material and folding it about said article, mechanism for twisting the folded wrapping material, and mechanism for compressing the folded and twisted wrapping material upon the labeled article.

10. A wrapping machine, comprising a pocket-provided article carrier, a suction mechanism for drawing a label within a pocket of said carrier within which pocket an article to be wrapped is placed, means for operating the suction mechanism, plunging mechanism for encompassing the labeled article with wrapping material and folding it about said article, mechanism for twisting the folded wrapping material, mechanism for compressing the folded and twisted wrapping material upon the labeled article, and mechanism for ejecting the wrapped article from the machine.

11. A wrapping machine for wrapping articles of conical form comprising a pocket-provided article carrier, means for placing a label within a pocket of said carrier within which pocket an article to be wrapped is placed, mechanism for encompassing both the base and the sides of the labeled article with wrapping material and folding it about said article, mechanism for twisting the wrapping material about the sides of the labeled article, and mechanism for compressing the folded and twisted wrapping material about the top or apex portion of the labeled article.

12. A wrapping machine for wrapping articles of conical form comprising a pocket-provided article carrier, means for placing a label within a pocket of said carrier within which pocket an article to be wrapped is placed, mechanism for encompassing both the base and the sides of the labeled article with wrapping material and folding it about said article, mechanism for twisting the wrapping material about the sides of the labeled article, mechanism for compressing the folded and twisted wrapping material about the top or apex portion of the labeled article, and mechanism for ejecting the wrapped article from the machine.

13. A wrapping machine for wrapping articles of conical form comprising a pocket-provided article carrier, a suction mechanism for drawing a label within a pocket of said carrier within which pocket an article to be wrapped is placed, means for operating the suction mechanism, mechanism for encompassing both the base and the sides of the labeled article with wrapping material and folding it about said article, mechanism for twisting the wrapping material about the sides of the labeled article, and means for compressing the folded and twisted material about the top or apex portion of the labeled article.

14. A wrapping machine for wrapping articles of conical form comprising a pocket-provided article carrier, a suction mechanism for drawing a label within a pocket of said carrier within which pocket an article to be wrapped is placed, means for operating the suction mechanism, mechanism for encompassing both the base and the sides of the labeled article with wrapping material and folding it about said article, mechanism for twisting the wrapping material about the sides of the labeled article, mechanism for compressing the folded and twisted wrapping material about the top or apex portion of the labeled article, and mechanism for ejecting the wrapped article from the machine.

15. A wrapping machine for wrapping articles of conical form comprising a pocket-provided article carrier, a suction mechanism for drawing a label within a pocket of said carrier within which pocket an article to be wrapped is placed, means for feeding step by step a strip of material for wrapping articles, means for severing part by part the strip of material as fed, a carrier for carrying forward the articles to be wrapped, means for intermittently operating said carrier, means for compressing an article upon a severed part of the strip, means for folding said severed part about the article to be wrapped, means for twisting upon the article the folded severed part of the wrapping material, means for compressing upon the article the folded and twisted material, positively operating article-ejecting devices, and means for said devices to eject the wrapped article from the machine.

16. A wrapping machine for wrapping articles of conical form comprising a pocket-provided article carrier, a suction mechanism for drawing a label within a pocket of said carrier within which pocket an article to be wrapped is placed, means for feeding step by step a strip of material for wrapping articles, means for severing part by part the strip of material as fed, a carrier for carrying forward the articles to be wrapped, means for intermittently operating said carrier, means for successively applying a label to each article to be wrapped, means for compressing an article upon a label and a severed part of the strip of material, means for folding said severed part about the labeled article to be wrapped, means for twisting upon the labeled article the folded severed part of the wrapping material, means for compressing upon the labeled article the folded and twisted material, and means for ejecting the wrapped article from the machine.

17. A wrapping machine, comprising a driving shaft, a front shaft, a side shaft, a back shaft, a counter-shaft, gearing connecting said shafts for occasioning their concomitant operation, an intermittently revolving article-carrying disk, foil-feeding mechanism, foil-cutting mechanism, foil-folding mechanism, foil-twisting mechanism, foil-compressing mechanism, article-ejecting mechanism, means for operating said mechanism, and connective means for occasioning the cyclical operation of said elements.

18. A wrapping machine, comprising a driving shaft, a front shaft, a side shaft, a back shaft, a counter-shaft, gearing connecting said shafts for occasioning their concomitant operation, an intermittently revolving article-carrying disk, label-applying devices, foil-feeding mechanism, foil-cutting mechanism, foil-folding mechanism, foil-twisting mechanism, foil-compressing mechanism, article-ejecting devices, and connective means for occasioning the cyclical operation of said elements.

19. A wrapping machine, comprising a pocket-provided carrier for receiving and feeding forward a plurality of articles to be wrapped placed in its pockets,—means for intermittently rotating said carrier,—means for intermittently feeding a strip of wrapping material beneath the carrier pockets as they are successively advanced,—means for cutting off parts of said strip as it is step by step fed beneath the pockets,—means for successively placing labels within the carrier pockets,—means for forcing the article to be wrapped with a label beneath it and a cut part of strip folded about its side upon an intermittently revoluble article-carrier,—means for effecting an initial twisting or compression about the article of the part of the strip so forced and folded upward,—means for completing the compression of the twisted cut strip about the article,—and means for positively ejecting the wrapped article from the machine.

20. A wrapping machine, comprising a pocket-provided carrier for receiving and feeding forward a plurality of articles to be wrapped placed in its pockets,—means for intermittently rotating said carrier,—means for intermittently feeding a strip of wrapping material beneath the carrier pockets as they are successively advanced,—means for cutting off parts of said strip as it is step by step fed beneath the pockets,—means for successively placing labels within the carrier pockets,—means for forcing the article to be wrapped with a label beneath it and a cut part of strip folded about its sides upon an intermittently revoluble article-carrier operated in connection with an anchor ring, a toggle lowering arm, and a toggle resisting arm,—means for effecting an initial twisting or compression about the article of the part of the strip so forced and folded upward,—means for completing the compression of the twisted cut strip about the article,—and means for positively ejecting the wrapped article from the machine.

21. In a wrapping machine, the following elements in combination:—means for intermittently revolving a pocket-provided carrying disk, means for intermittently locking it pocket by pocket, suction devices for applying labels to the pockets of the carrying disk, means for feeding wrapping material beneath the pockets of the carrying disk, means for cutting off parts of the wrapping material, means for placing wrapped and labeled articles upon revoluble toggle-carriers, a turret for the toggle-carriers, means for operating the toggle-carriers, means for operating the turret, means for twisting or compressing the wrapping material about the labeled article, means for compressing and smoothing the wrapping material over the wrapped article, means for positively ejecting the wrapped articles from the machine.

22. In a wrapping machine, a magazine for containing a stack of labels, a suction device for sucking the labels out of the magazine and leaving them in pockets of the disk, means for occasioning the intermittent operation of the suction device, an intermittently revolving pocket-provided article-carrying disk, and means for operating said disk.

23. In a wrapping machine, in which are combined a fixed label magazine and a rotating bud disk having peripheral pockets, a sucking mechanism adapted to operate relatively to both the disk and the label magazine, and means for raising and lowering said sucking mechanism relatively to the pockets in the disk and the label magazine.

24. In a wrapping machine, in which are combined a fixed label magazine and a rotating bud disk having peripheral pockets, a sucking mechanism adapted to operate relatively to both the disk and the label magazine, means for raising and lowering said sucking mechanism relatively to the pockets in the disk and the label magazine, a plunging mechanism adapted to operate relatively to both the disk and the label magazine, and means for raising and lowering said plunging mechanism.

25. In a wrapping machine, in which are combined a fixed label magazine and a rotating disk having peripheral pockets, a sucking mechanism adapted to operate relatively to both the disk and the label magazine, means for raising and lowering said sucking mechanism relatively to the pockets in the disk and the label magazine, a plunging mechanism adapted to operate relatively to both the disk and the label magazine, means for raising and lowering said plunging mechanism, a revoluble turret carrying a plurality of compressible and extensible toggle-carriers, means for occasioning the intermittent revolution of the turret, means for controlling the extension and compression of the toggle-carriers, and connective means for occasioning the desired cyclical operation of said elements.

26. In a wrapping machine, in which are combined a fixed label magazine and a rotating disk having peripheral pockets, a sucking mechanism adapted to operate relatively to both the disk and the label magazine, means for raising and lowering said sucking mechanism relatively to the pockets in the disk and to the label magazine, a plunging mechanism adapted to operate relatively to both the disk and the label magazine, means for raising and lowering said plunging mechanism, a revoluble turret carrying a plurality of compressible and extensible toggle-carriers, means for occasioning the intermittent revolution of the turret, and the means for controlling the extension and compression of the toggle-carriers comprising a fixed horse-shoe-shaped anchor-ring, a toggle lowering arm, and a toggle-spring-resisting arm, means for operating said arms, and connective means for occasioning the cyclical operation of said elements.

27. In a wrapping machine of the character stated, an intermittently rotating article carrier having circumferential apertures, mechanism for placing wrapping material beneath the apertures, means for applying labels within the apertures over the wrapping material, means for folding, twisting and compressing the wrapping material, a toggle-carrying turret, means for occasioning the step by step revolution of said turret, a plurality of toggle carriers to successively receive articles to be wrapped, means for intermittently revolving, expanding and compressing said toggle carriers, and connective means for occasioning the cyclical operation of said elements.

28. In a wrapping machine, comprising a label magazine, a rotatable bud-carrying disk having circumferential bud pockets, a label magazine, a sucking mechanism which consists of a nozzle head having an apertured spindle connected with the nozzle tube, a label bushing formed with a chamber and connected and adapted to be raised and lowered with the nozzle head, means for raising and lowering the nozzle head, bushing, spindle, and nozzle tube relatively to the magazine and to the pockets in the bud carrier, and means for intermittently exhausting air through the nozzle head, spindle, bushing, and nozzle tube.

29. In a wrapping machine, in combination with a magazine for containing a stack of labels to be successively applied to a plurality of articles to be wrapped as the latter are successively presented to the magazine, a rotatable bud-carrying disk having a series of circumferentially disposed pockets adapted to be successively presented to the discharging end of the magazine, a nozzle head, means for raising and lowering said nozzle-head through the disk pockets as successively presented, an apertured spindle for the nozzle head, a label bushing relatively to which said nozzle head has common movement, a nozzle tube, a valve chamber for said nozzle tube, pipe connections to a vacuum tank, a valve on said pipe connections, and means for operating said valve.

30. In a wrapping machine of the character stated, an intermittently rotating bud-carrier having circumferential apertures, mechanism for placing wrapping material beneath the apertures, means for applying labels within the apertures over the wrapping material, a toggle-carrying turret, means for occasioning the step by step revolution of the turret, a plurality of toggle-carriers to successively receive articles to be wrapped, means for intermittently revolving, expanding and compressing said toggle carriers, an anchor ring, a toggle lowering arm, a toggle-spring-resisting arm, means for operating said arm, and connective means for occasioning the cyclical operation of said elements.

31. In a wrapping machine of the character stated, an intermittently rotating article-carrier having circumferential apertures, mechanism for placing wrapping material beneath the apertures, a toggle-carrying turret, means for occasioning the step by step revolution of said turret, a plurality of toggle-carriers to successively receive articles to be wrapped, means for intermittently revolving, expanding and compressing said toggle-carriers, an anchor ring, a toggle-lowering arm, a toggle-spring-resisting arm, means for operating said arms, and connective means for occasioning the cyclical operation of said elements.

32. In a wrapping machine in which are combined an article carrying disk, a revoluble turret, and a plurality of rotatable toggle-carriers upon said turret, a special mechanism to occasion the predetermined compression and expansion of the toggle carriers, which consists of an anchor ring, a toggle lowering arm, a toggle-spring-resisting arm, and means for operating said arms.

33. In a wrapping machine of the character set forth, a special mechanism for effecting the ultimate compression of the wrapping material upon the article to be wrapped, which consists of a pair of spring-controlled bumpers the operating faces of which are covered by piled material, and universally jointed mechanism for bringing together and spreading apart the bumpers relatively to the article to be wrapped.

34. In a wrapping machine of the character set forth, a special mechanism for effecting the ultimate compression of the wrapping material upon the article to be wrapped, which consists of a pair of spring-controlled bumpers the operating faces of which are covered by piled material, and of a pair of cam-controlled bumper levers connected with the bumpers and universally jointed relatively to the frame of the machine.

In testimony whereof I have hereunto signed my name, this 23rd day of October, A. D. 1914.

LAWRENCE H. WILBUR.

In the presence of—
J. BONSALL TAYLOR,
C. D. McVAY.